US008817758B2

(12) United States Patent
Fox et al.

(10) Patent No.: US 8,817,758 B2
(45) Date of Patent: Aug. 26, 2014

(54) TELECOMMUNICATIONS SYSTEM THAT ROUTES COMMUNICATION FROM MULTIPLE RADIO ACCESS TECHNOLOGIES THROUGH A COMMON CONTROL PLANE GATEWAY ENTITY

(75) Inventors: David Andrew Fox, Reading (GB); Christopher Pudney, Newbury (GB)

(73) Assignee: Vodafone Group PLC, Newbury, Bershire (GB)

( * ) Notice: Subject to any disclaimer, the term of this patent is extended or adjusted under 35 U.S.C. 154(b) by 1237 days.

(21) Appl. No.: 12/067,645

(22) PCT Filed: Oct. 5, 2006

(86) PCT No.: PCT/GB2006/003725
§ 371 (c)(1),
(2), (4) Date: Dec. 17, 2008

(87) PCT Pub. No.: WO2007/039757
PCT Pub. Date: Apr. 12, 2007

(65) Prior Publication Data
US 2009/0111458 A1    Apr. 30, 2009

(30) Foreign Application Priority Data

Oct. 5, 2005 (GB) .................................. 0520254.4

(51) Int. Cl.
*H04W 4/00* (2009.01)
*H04H 20/67* (2008.01)
*H04J 3/00* (2006.01)
(52) U.S. Cl.
USPC ............ 370/338; 370/336; 370/337; 370/339
(58) Field of Classification Search
CPC .................................................. H04W 84/12
USPC .......................................... 370/338, 337, 339
See application file for complete search history.

(56) References Cited

U.S. PATENT DOCUMENTS

2003/0185190 A1* 10/2003 Chitrapu et al. ............... 370/338
2004/0068571 A1*  4/2004 Ahmavaara ................... 709/228
(Continued)

OTHER PUBLICATIONS $3^{rd}$ *Generation Partnership Project; Technical Specification Group Services and System Aspects; 3GPP System Architecture Evolution: Report on Technical Options and Conclusions (Release 7)*, 3GPP TR 23.882 drft V0.6.0, Sep. 2005, pp. 1-27.

(Continued)

*Primary Examiner* — Brandon Renner
*Assistant Examiner* — Abdelnabi Musa
(74) *Attorney, Agent, or Firm* — Workman Nydegger

(57) ABSTRACT

A telecommunications system is disclosed, including a first radio access technology (legacy: GSM; UMTS/UTRAN) having a first radio access network (node B 15, RNC 17), and a second radio access technology (EUTRA) having a second radio access network (AP 20), wherein said first radio access network (node B 15, RNC 17) is divided into a plurality of first areas and said second radio access network (AP 20) is divided into a plurality of second areas, and wherein a home subscriber server entity (HSS 10) is provided that is common to both the first and second radio access technologies (legacy: GSM; UMTS) and which controls in which of the first and second areas a mobile terminal (UE 1) is registered, characterized in that a common control plane gateway entity (CP-GW 24) is provided through which communications from the first and second radio access networks, which relate to the first and second area which the mobile terminal (UE 1) occupies, are routed.

40 Claims, 9 Drawing Sheets

(56) References Cited

U.S. PATENT DOCUMENTS

2005/0265279 A1* 12/2005 Markovic et al. ............. 370/328
2007/0019575 A1* 1/2007 Shaheen ....................... 370/310

OTHER PUBLICATIONS

*3rd Generation Partnership Project; Technical Specification Group Radio Access Network; Evolved Universal Terrestrial Radio Access (UTRA) and Universal Terrestrial Radio Access Network (UTRAN); Radio interface protocol aspects (Release 7)*, 3GPP TR 25.813 V0.0.1, Aug. 2005, pp. 1-15.

*3rd Generation Partnership Project; Technical Specification Group Radio Access Network; Requirements for Evolved UTRA (E-UTRA) and Evolved UTRAN (E-UTRAN) (Release 7)*, 3GPP TR 25.913 V7.1.0, Sep. 2005, pp. 1-16.

* cited by examiner

TELECOMMUNICATIONS SYSTEM THAT ROUTES COMMUNICATION FROM MULTIPLE RADIO ACCESS TECHNOLOGIES THROUGH A COMMON CONTROL PLANE GATEWAY ENTITY

FIELD OF THE INVENTION

The present invention relates to a telecommunications system.

BACKGROUND TO THE INVENTION

Currently 2G (GSM), 2.5G (GPRS) and 3G (UMTS/UTRA) mobile or cellular telecommunications networks co-exist. Mobile terminals provide continuous service while moving from a 2G coverage area to a 3G coverage area of a network.

A development of 3G mobile telecommunications is "evolved" UTRA or E-UTRA, also referred to as SAE (System Architecture Evolution)/LTE (Long Term Evolution). It is desirable for mobile terminals to provide continuous service also when moving from a E-UTRA coverage area to a 3G or 2G coverage area.

SUMMARY OF THE INVENTION

According to a first aspect of the present invention, there is provided a telecommunications system including a first radio access technology having a first radio access network, and a second radio access technology having a second radio access network, wherein said first radio access network is divided into a plurality of first areas and said second radio access network is divided into a plurality of second areas, and wherein a home subscriber server entity is provided that is common to both the first and second radio access technologies and which controls in which of the first and second areas a mobile terminal is registered, characterized in that a common control plane gateway entity is provided through which communications from the first and second radio access networks, which relate to the first and second area which the mobile terminal occupies, are routed.

In the embodiment the first areas and the second areas are paging areas, such as routing areas or the equivalent thereof. That is, the areas are collections of cells, each cell being served by a particular base station/access point. Such areas are provided because, as is known to those skilled in the art, and as is discussed briefly below, this provides efficient paging of mobile terminals.

The first radio access technology may be 2G or 3G, and the second radio access technology may be EUTRA or 4G.

In a conventional mobile network the connection between the SGSN and the home subscriber server entity is the Gr interface. In the embodiment to be described the control plane entity comprises part of the Gr interface to the home subscriber entity. In the embodiment the control plane gateway entity receives communications relating to the first areas from the SGSN of the first radio access technology.

In the embodiment the first areas are different from the second areas. The mobile terminal is registered in a different one of the first and second areas. The first areas and the second areas may advantageously be different in order to allow each of the radio access technologies to be optimised. For example, the radio characteristics of the different radio access technologies may be different, meaning that the size of a cell of one of the radio access technologies will be different to the optimum size of the cell of the other radio access technology. For radio access technology where the cells are smaller, the routing areas may be smaller. However, advantageously, selected first areas are associated with selected second areas. The associated first and second areas may be deemed to be equivalent areas in the respective radio access technologies. The equivalent areas may cover the same geographical area.

The mobile terminal has idle or inactive states in each of the radio access technologies. In the embodiment the first radio access technology is UTRA. In UTRA the inactive states are RRC-IDLE and URA-PCH. Advantageously, no signaling to the home subscriber identity is performed from the mobile terminal moves from an inactive state of one of the radio access technologies to an inactive state of the other radio access technology. Such a movement may occur when the mobile terminal moves from registration with a base station/access point of one radio access technology to be registered with a base station/access point of another radio access technology (that is within the equivalent area) whilst that mobile terminal is in the idle state.

A timer may run between the control plane gateway entity and the mobile terminal when the mobile terminal is registered with both the first and second radio access technologies, which timer causes the first and second areas to be updated periodically. This is in contrast to having an independent periodic area update timer running between the mobile terminal and the first radio access technology and an independent periodic area update timer running between the mobile terminal and the second radio access technology. Such an arrangement would require a mechanism to synchronise the two independent timers. It is advantageous that these two separate area update timers are replaced with a single periodic update timer that runs to a network entity (the control plane gateway entity) shared by the first radio access technology and the second radio access technology.

The mobile terminal may be allocated a different temporary identifier (TMSI) for use in the one of the first areas with which it is registered and a different temporary identifier (TMSI) for use with the one of the second areas with which it is registered.

In the embodiment, when the mobile terminal is registered with the first radio access technology, and is in the inactive state, the mobile terminal operates a timer to cause it to attempt to contact the home subscriber service entity at predetermined time intervals. Advantageously, the timer is also operated when the mobile terminal is registered with the second radio access technology. If the timer expires while not in first radio access technology coverage, the mobile terminal contacts the first radio access technology when it next returns to first radio access technology coverage. This is necessary in order to keep the Radio Resource Control states in the mobile terminal and first radio access network synchronized. If the first radio access network believes the mobile terminal is in the idle mode but the mobile terminal believes that it is in the active mode, then mobile-terminating paging may be lost (if the first radio access network pages is with a different identifier in the idle mode to that used by the mobile terminal to respond to paging when it believes that it is in the active state).

In the embodiment, when the mobile terminal is registered with the second radio access technology, and the mobile terminal modifies a state (for example, GMM (GPRS Mobility Management) and SM (session management) contexts) by notifying the control plane gateway entity, a reference value stored by the first radio access technology is updated, and wherein, when the mobile terminal is subsequently registered with the first radio access technology the change in reference value is detected, which prompts the first radio access technology to obtain information regarding the state change from the control plane gateway entity. The reference value is stored in the mobile terminal and by the first radio access technology (in the SGSN in the embodiment). The control plane gateway entity modifies the reference value stored in the SGSN, so that the mismatch between mobile terminal reference value and the SGSN-stored reference value will be detected when the first radio access technology in subsequently used. If the SGSN detects a reference value mismatch, the SGSN pulls the SM and GMM context from the control plane gateway entity.

In the embodiment mobile terminal terminating activities, such as SMS, based on identifiers, such as the MSISDN or IMSI, used within the first or second radio access technologies are routed to the control plane gateway entity.

According to a second aspect of the invention there is provided, a telecommunications system including a radio access technology having a radio access network comprising a plurality of access points with which a mobile terminal can be registered, and a control plane gateway entity and a user plane gateway through which communications from the radio access network are routed, characterized in that the mobile terminal measures the quality of the received radio signal from an access point neighbouring the access point with which it is registered and selectively causes the mobile terminal to register with the neighbouring access point in dependence upon this determination, and wherein the control plane gateway entity is only subsequently notified of the change of access point with which the mobile terminal is registered.

In the embodiment, the neighbouring access point notifies the control plane gateway entity that it controls the mobile terminal. The control plane gateway is not informed in a real-time manner of the access point change. The negotiation of the radio resource allocation is completed directly between access points. Negotiation of transport resources is completed between the access points and the user plane gateways. The neighbouring access point requests a downlink user plane from the user plane gateway by sending an uplink data packet including an add bearer path indication. The access point sends an uplink data packet to the user plane gateway including a bearer path release indication.

According to a third aspect of the invention there is provided, a telecommunications system including a first radio access technology having a first radio access network, and a second radio access technology having a second radio access network, wherein said first radio access network is divided into a plurality of first areas and said second radio access network is divided into a plurality of second areas, and wherein a home subscriber server entity is provided that is common to both the first and second radio access technologies and which controls in which of the first and second areas a mobile terminal is registered, and wherein a user plane gateway through which communications from the first and second radio access networks are routed is provided; characterized in that the user plane gateway maintains an indication of whether the mobile terminal last transmitted data using the first radio access technology or the second radio access technology.

This indication may be used by the user plane gateway to control the paging procedure.

In the embodiment, the user plane gateway maintains the indication (for example, a flag), rather than a control plane gateway or a SGSN.

The user plane gateway may maintain a second indication, indicating whether the mobile terminal is registered with the second radio access technology.

In the embodiment, if the second indication indicates that the mobile terminal is registered with the first access technology and the first indication indicates that the last data was transmitted using the second radio access technology, the user plane gateway passes a copy of a downlink data packet to the first radio access technology (that is, forking of the downlink packet is performed). The user plane gateway passes requests the control plane gateway to page for the mobile terminal. The copy of the downlink packet includes a flag indicating it is for the purposes of paging, on the SGSN of the first radio access technology.

In the embodiment, the first radio access technology determines whether the mobile terminal is able to receive the copy of the downlink data packed. The determination may be based on whether the mobile terminal is in a standby state, or on whether a connection to the mobile terminal exists. If the mobile terminal is unable to receive the copy of the downlink data packet, the data packet is returned to the user plane gateway entity, preferably with an indication that paging in a wider area should be performed by the first radio access technology. When this paging process is completed, the SGSN of the first radio access technology sends an indication to the user plane entity model of whether the mobile terminal was reachable or not.

According to a fourth aspect of the invention there is provided, a telecommunications system including a first radio access technology having a first radio access network, and a second radio access technology having a second radio access network, wherein said first radio access network is divided into a plurality of first areas and said second radio access network is divided into a plurality of second areas, and wherein a home subscriber server entity is provided that is common to both the first and second radio access technologies and which controls in which of the first and second areas a mobile terminal is registered, characterized in that a common control plane gateway entity is provided, in that the first areas are different from the second areas, in that the mobile terminal is registered in a different one of the first and second areas, in that selected first areas are associated with selected second areas and are deemed to be equivalent areas, and in that the control plane gateway entity is operable to page the mobile terminal in the equivalent routing areas.

The paging of the equivalent routing areas is preferably performed simultaneously or concurrently.

BRIEF DESCRIPTION OF THE DRAWINGS

For a better understanding of the present invention embodiments will now be described by way of example, with reference to the accompanying drawings, in which.

In the drawings like elements are generally designated with the same reference sign.

DETAILED DESCRIPTION OF EMBODIMENT OF THE INVENTION

Figure 1:
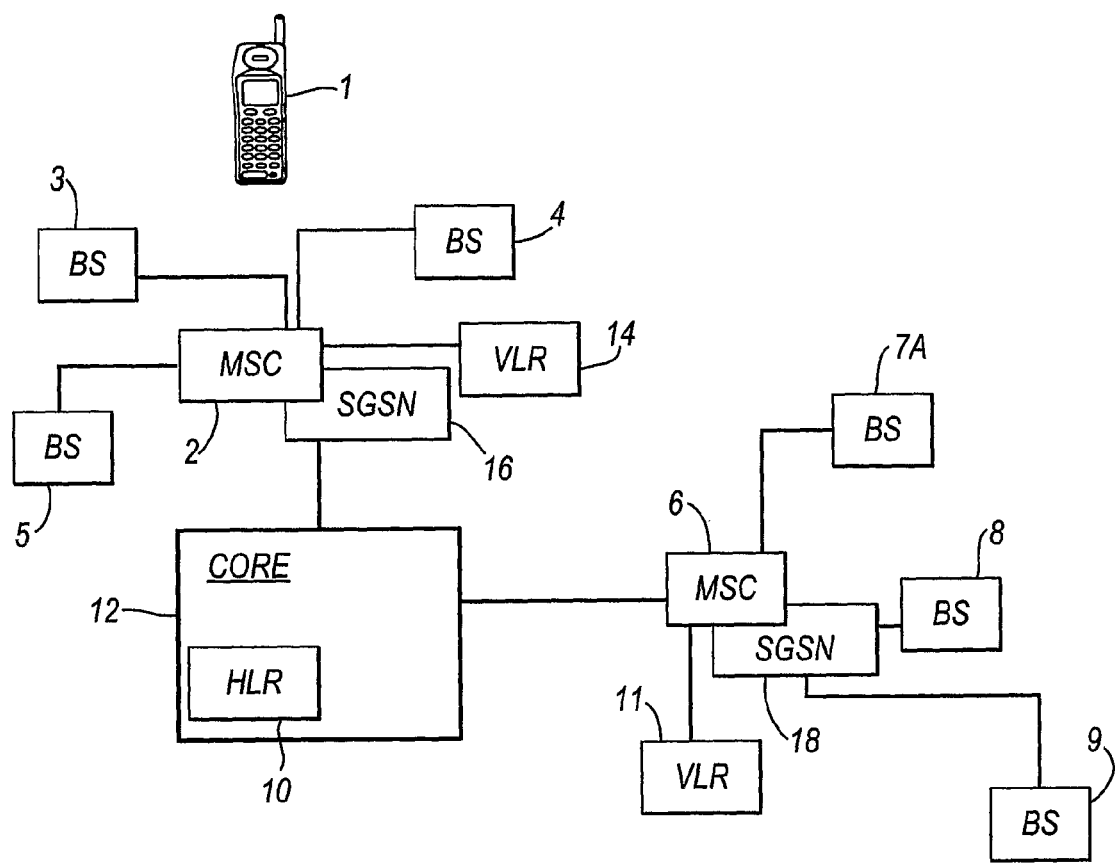
FIG. 1 is a diagrammatic drawing of key elements of a mobile telecommunications network for use in explaining the operation of such a network.

Key elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (or User Entity-UE) is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

Figure 2:
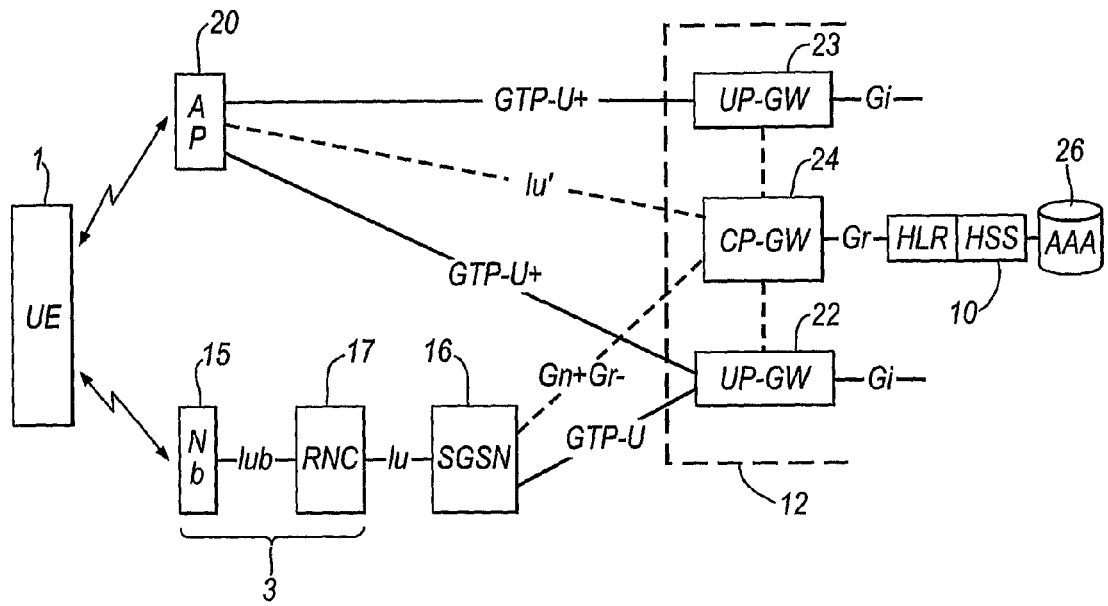
FIG. 2 shows the proposed architecture for a distributed RNC model in accordance with the embodiment of the invention.

In a UMTS mobile telecommunications network, each base station comprises a node B (15 in FIG. 2) and a radio network controller (RNC) (17 in FIG. 2). An RNC may control more than one node B. The node B's and RNC's comprise the radio access network.

Conventionally, the base stations are arranged in groups and each group of base stations is controlled by one mobile switching centre (MSC), such as MSC 2 for base stations 3,4 and 5. As shown in FIG. 1, the network has another MSC 6, which is controlling a further three base stations 7,8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate location in the HLR 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal with the MSC 2 similar to the IMSI in network use. The TMSI number is a unique, often randomly assigned, identification number that is typically 20-24 bits in length. In conventional systems, therefore, the TMSI number is not allocated to more than one user of a given system served by that MSC at one time. Consequently, the TMSI number is usually invalidated when the mobile station crosses into a new location served by a different MSC or after a predetermined period of time following initial allocation of the TMSI number (e.g., 12 hours).

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

Handover between two cells served by the same MSC/SGSN is relatively straightforward (this is referred to as "soft handover"). The handover process is more complex when a mobile terminal moves between a first cell served by a first MSC/SGSN and a second cell served by a second MSC/SGSN (this is referred to as a "hard handover"). The VLRs of the MSCs/SGSNs and the HLR additionally have to be updated to reflect that the mobile terminal is now in a cell served by the second MSC/SGSN.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell is occupied by a terminal is always know, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it moves into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile, including a new TMSI. It also passes on subscription details of the user to the new VLR and informs the old VLR to delete its records.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) (in addition to the data mentioned above indicative of the identity of its location area). The mobile terminal uses this received data to determine when it moves to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

Communications between the mobile terminal 1 and the network core 12 can be considered to be split into a control plane and a user plane.

The control plane performs the required signaling, and includes the relevant application protocol and the signaling bearer for transporting the application protocol messages. Among other things, the application protocol is used for setting up the radio access bearer in the radio network layer. The user plane transmits data traffic and includes data streams and data bearers for the data streams. The data streams are characterized by one or more frame protocols specified for that interface.

Generally speaking, the user plane carries data for use by a receiving terminal—such as data that allows a voice or picture to be reproduced—and the control plane controls how the data is transmitted.

A mobile terminal has an active mode and an idle mode.

A mobile terminal is in active communication when it has a CS (Circuit Switched) connection established. For PS (Packet Switched), active communication is defined by the existence of one or more Activated PDP (Packet Data Protocol) contexts. Either one or both of the mentioned active communications may occur in the mobile terminal.

Whilst in GSM or UMTS idle mode, a mobile terminal has no CS connection or activated PDP context. In the idle mode the mobile terminal implements cell selection and reselection procedures. The mobile terminal is registered on the network, and listens for paging messages. The mobile terminal performs location area updates when necessary. The idle state in GRPS indicates that the mobile has not yet registered onto the network or is switched off.

For a UMTS mobile terminal, in the active mode the terminal is considered to be in the RRC (Radio Resource Control) connected mode. In the mode there are four states:

CELL_DCH state is characterized by:
  A dedicated physical channel is allocated to the UE in uplink and downlink.
  The UE is known on cell level according to its current active set
  Dedicated transport channels, downlink and uplink (TDD) shared transport channels and a combination of these transport channels can be used by the UE.

CELL_FACH state is characterized by:
  No dedicated physical channel is allocated to the UE.
  The UE continuously monitors a FACH (forward access channel) in the downlink.
  The UE is assigned a default common or shared transport channel in the uplink (e.g. RACH) that it can use anytime according to the access procedure for that transport channel.
  The position of the UE is known by UTRAN on cell level according to the cell where the UE last made a cell update.
  In TDD mode, one or several USCH or DSCH transport channels may have been established.

CELL_STATE is characterized by:
  No dedicated physical channel is allocated to the UE. The UE selects a PCH (paging channel) with the algorithm, and uses DRX for monitoring the selected PCH via an associated PCH.
  No uplink activity is possible.
  The position of the UE is known by UTRAN on cell level according to the cell where the UE last made a cell update in CELL_FACH state.

URA_PCH state is characterized by:
  No dedicated channel is allocated to the UE. The UE selects a PCH with the algorithm, and uses DRX for monitoring the selected PCH via an associated PCH.
  No uplink activity is possible.
  The location of the UE is known on UTRAN Registration area level according to the URA assigned to the UE during the last URA update in CELL-FACH state.

1 Introduction to the Embodiment/Requirements

The discussions on the 3GPP System Architecture Evolution have highlighted a number of areas where further work is required to successfully implement Evolved UMTS Radio Access (E-UTRA).

As discussed above, mobile telecommunications networks are divided into routing areas. The embodiments to be described are in one aspect directed to provide an efficient mechanism for providing a E-UTRA network with routing areas and for efficiently handling the relationship between the routing areas of an E-UTRA network and other networks, such as existing 2G and 3G networks.

At the joint SA2/RAN WG meeting in Tallinn, the following requirement was agreed:

"The SAE (System Architecture Evolution)/LTE (Long Term Evolution) system shall provide effective means to limit mobility related signalling during inter-RAT (Radio Access Technology) cell-reselection in LTE_IDLE state. For example, with similar performance to that of the "Selective RA Update procedure" defined in TS 23.060."

Existing potential solutions will now be briefly described.

Existing Solution—Do Nothing

This does not meet the requirement, but, is a feasible solution for single-mode E-UTRA terminals, or, if the E-UTRA coverage does not overlap other coverage areas, or, if the proportion of "dual" mode terminals is low.

Existing Solution—Common Routeing Area

Placing the GSM and UMTS cells into the same LA and RA is the basic part of the UMTS/GSM solution. However this does mean that both the MSC and SGSN are shared between 2G and 3G. This is awkward for the SGSN as it has to support both the Gb and Iu-ps interfaces and their different RAN/CN functional splits.

From a standardisation point of view, it would be relatively easy to extend this concept to cover E-UTRA, UTRA and GSM. However, from an implementation point of view, it is unlikely that it will be ideal to develop core network nodes that support all of the Gb, the Iu-ps and the E-UTRA RAN-CN interface.

In addition, the "signalling free movement between 2G and 3G" only applies in the "idle" state (GPRS-Standby to (Packet Mobility Management) PMM idle) and means that the UTRAN Registration Area (URA) Paging Channel (PCH) state does not get utilised to its full benefit.

Existing Solution—Common RNC

With "basic GSM" and "EDGE", and with GSM in different frequency bands (900, 1800, etc), a common BSC can be used with all the cells in the same LA/RA.

A similar technique could be used for connecting E-UTRA and UTRA cells to the same RNC. This does constrain the E-UTRA architecture but might permit the URA-PCH/long live Iu-ps connections to be maintained.

Alternative Solution Equivalent Routeing Areas and SGSN Proxy

The embodiment of the invention now to be described explains this solution in more detail. The embodiment shows one of the architectures and describe how it can interact with the legacy (UTRAN and GERAN) architectures. Also described some concepts/principles/mechanisms that could be used to solve the issues of mobility between systems and allow for a flexible/modular implementation.

One of the main issues is how "inactive mode" mobility is to work between the new system and the existing UTRAN/GERAN systems. One of the main requirements for location management of a UE (User Equipment) between the EUTRA system and 2G/3G is to provide a signalling-less movement between EUTRA and 2G/3G in Idle mode and seamless mobility when the UE is in a connected mode. The reason to avoid UE to network signalling is that this reduces signalling load on the core network; reduces terminal battery consumption; reduces radio load; and, improves the chance of successful paging.

In the connected mode there is one UMTS RNC (Radio Network Controller) that is acting as SRNC (Serving RNC), and an RRC (Radio Resource Control) connection is established between the UE (User Equipment) and this SRNC. In the idle mode a UE implements cell selection and reselection procedures, the mobile is registered on the network and is listening for paging messages, and the mobile performs location area updates when necessary.

In the UMTS R'99 document, which is hereby fully incorporated by reference, these issues were solved by permitting combined 2G-3G SGSNs (and combined 2G-3G MSCs). Other functionality such as "supercharger" and Release 5 "Iu-flex" also were aimed at reducing the signalling impact on the HLR. To duplicate the R'99 solution for the LTE/SAE work leads to considerable constraints on the E-UTRA architecture, e.g. mandating that the "future Core network node" supports both Iu and Gb interfaces. The embodiment to be described provides an alternative solution for E-UTRA.

There will now be described some signalling flows to illustrate how the Intra E-UTRA handover may work for the distributed RNC architecture solution, including a solution for uplink soft handover and hard handover.

2 Evolved Architecture

FIG. 2 illustrates a proposed architecture for the distributed model, where the User plane and Control plane of the Home Gateway are split into separate entities.

The Access Point (AP) 20 of the proposed new system hosts the BTS and control plane RNC functions.

The User Plane Gateway (UP-GW) 22 houses functions such as selective combining (if needed), Flow based Charging, NATs, IP header compression, User plane ciphering, Content Filtering. To minimize latency, all functions that examine IP headers/content are completed with one entity. A second User Plane Gateway (UP-GW) 23 may be simultaneously access by UE 1 in some circumstances, for example of that UE 1 is a dual stack UE and has two IP addresses.

The Control Plane Gateway (CP-GW) 24 of the Evolved Architecture controls the UP-GWs 22,23, handles interactions with the HLR/HSS 10 and the AAA (Access, Authentication and Accounting) server 26, and performs the function of the GGSN for the 3G-SGSNs and 2G-SGSNs.

In this architecture, the "2G/3G packet core" connects to the "evolved (E-UTRA) packet core" as follows:
the user plane from the 2G/3G SGSN 16 connects to the User Plane Gateway UP-GW 22 via the GTP-U part of Gn.
the control plane part of the Gn interface connects the 2G/3G SGSN 16 to the Control Plane GateWay CP-GW 24 via a somewhat modified GTP-C part of Gn.
for E-UTRA capable UEs, the SGSN 16 does not send MAP (Mobile Application Part) signaling to the HLR/HSS 10—even when not in E-UTRA coverage. Instead these functions are proxied across "Gr minus" to the CP-GW. The CP-GW 24 has a Gr reference point between it and the HSS 10/AAA 26.

Between the E-UTRA Access Point AP 20 the interfaces need not be based on GTP/Iu, however, the same functional split might apply.

On top of the 'traditional' reasons, separation of the Gateway in user plane and control plane units eases the use of multiple APNs by the subscriber (e.g. a dual stack UE with IPv4 and IPv6 APNs; or a corporate customer with a corporate APN and an APN for MMS). This User plane and Control plane separation permits each APN's UP-GW to be deployed in the most appropriate location, e.g. for the geographic routing of their traffic. Thus, each APN may potentially be a different UP-GWs 22,23.

Note: these techniques may also be applicable to other architectural concepts (e.g. there could be an E-UTRA RNC in between the AP box 20 and the UP/CP-GW boxes 22,23, 24).

3 Principles

The main concepts that will be seen in the embodiment are those of:
Separation of the User and Control plane functions of the Home Gateway (GGSN-like function).
Equivalent Routeing Areas The concept is summarized as follows:
a) the E-UTRA Access Points and UTRA-GSM cells are in separate Routeing (Tracking) Areas.
b) Upon Attach and RA update, the UE is "accepted" into multiple, Equivalent Routeing Areas (i.e. corresponding routing areas for E-UTRA and UTRA-GSM). Typically, one is for E-UTRA and one is for UTRA/GSM. The UE may be allocated different P-TMSIs in the different Routing/Tracking Areas.
c) When the UE moves between (E-UTRA) LTE-IDLE and an "inactive" UTRA state, the UE does no signaling to the network (as long as the new cell is within one of the set of Equivalent Routeing Areas). The "inactive" UTRA states are RRC-IDLE and URA-PCH. It should be noted carefully here that the term "inactive" used here includes the state URA_PCH, which is conventionally referred to as an active or RRC connected state. In the URA_PCH state the mobile terminal operates a URA update timer which prompts it to contact the HSS 10 every 10 minutes. The nature of a CELL-PCH and CELL-FACH are FFS.
d) Movement to E-UTRA from UTRA by UEs in URA-PCH does not cause the Iu-PS connection to be released. This permits fast reconnection of the UE's data flow if the UE later returns to UTRA.
e) While in E-UTRA, the UE keeps the periodic URA update timer running. If this expires while not in UTRA coverage, the UE contacts the UTRA when it next returns to UTRA coverage. This is necessary in order to keep the RRC states in the UE and RNC synchronized. If the RNC believes the UE is in RRC-IDLE but the UE believes that it is in RRC CONNECTED mode (any of the conventional active states, including URA_PCH), then mobile-terminating paging is lost (because the RNC 17 pages with the P-TMSI (which is used in the RRC IDLE mode) but the mobile will only respond to paging with its radio network temporary identifier, RNTI, which is transmitted by the mobile terminal when it believes that it is in an RRC connected state).
f) If the new cell is in a Routeing Area that is not within the list of equivalent RAs, then the normal RAU procedure is performed.
g) When the mobile changes RAT while in an "active state" (e.g. from E-UTRA to UTRA or vice versa), UE-network signaling takes place to ensure that user data is correctly routed. The "active" states include LTE-active, UTRA-Cell-DCH and GPRS-Ready.
h) For E-UTRA UEs, GMM (GPRS Mobility Management) and SM (session management) contexts in the SGSN 16 and the CP-GW 24 are synchronized by the SGSN 16 proxying GMM and SM (session management) signaling to the CP-GW 24, and, by using a "context reference number" (CRN) that is stored in the UE 1 and the SGSN 16. Whenever the UE 1 modifies its SM or GMM state via E-UTRA, the CRN is updated or changed in the SGSN. When the UE accesses via UTRA or 2G, the UE 1 sends its CRN to the SGSN 16. If the SGSN 16 detects a CRN mismatch, the SGSN 16 pulls the SM and GMM context from the CP-GW 24. Changes in the security context that are made on E-UTRA may be pushed towards the SGSN(s) 16 in advance of the UE 1 leaving E-UTRA.

i) The Periodic RA (routing area) Update Timer of the UTRA or 2G network is replaced with a Periodic SMU Timer, running between the UE and the CP-GW. That is, rather than having independent periodic update functions between the UE 1 and E-UTRA and the UE 1 and 2G/3G plus a mechanism to synchronise them, these two functions are replaced by a single periodic update procedure using the SMU timer running to a network entity shared by E-UTRA and 2G/3G, such as the CP-GW 24.

j) If needed, Mobile Terminating activities based on MSISDN/IMSI—rather than IP address—(e.g. Location Services, SMS) are routed to the CP-GW.

k) The Access Point 20 informs the UP-GW(s) from which it has sent/received data if the UE leaves the LTE-Active state.

(l) When the mobile is in LTE-idle and a downlink IP packet arrives at the User Plane Gateway (UP-GW) entity of the GW, then the UP-GW entity contacts the Control Plane Gateway (CP-GW), and the CP-GW initiates the Paging procedure in all of that UE's Equivalent RAIs.

At Attach/Routeing Area update the 2G/3G SGSN sends the Mobile Application Part ("MAP") signalling to the CP-GW 24 rather than to the HLR/HSS 10. The CP-GW 24 processes the message and, if needed, contacts and updates the HLR/HSS 10.

This process permits the "VLR" 14 data in the 2G/3G SGSN and the CP-GW 24 to remain synchronised.

MSISDN/IMSI based routeing of any UE activity (e.g. Location Services, SMS) is made easier, as the routeing is handled by a single entity (CP-GW 24). (See Gateway Location Register Specification from R'99).

Quick restoration of the UMTS Iu connection for UEs in IDLE mode, and, those moving in from E-UTRA (and GSM-GPRS). Movement to E-UTRA from UMTS by mobiles in URA-(Paging Channel PCH) does not cause the Iu-PS connection to be released.

Introduction of a (Tunnel Endpoint Identifier) TEID being allocated to UE 1, so connections from different AP to the same UP-GW 24 for a UE 1 would use the same TEID at the UP-GW 22 on different IP links. This allows bearers to be established between the AP and the UP-GW 22 without real-time interaction with the CP-GW 24.

4 States Description 4.1 Basic Radio/Global Multimedia Mobility (GMM) States at the UE 1

Figure 3:
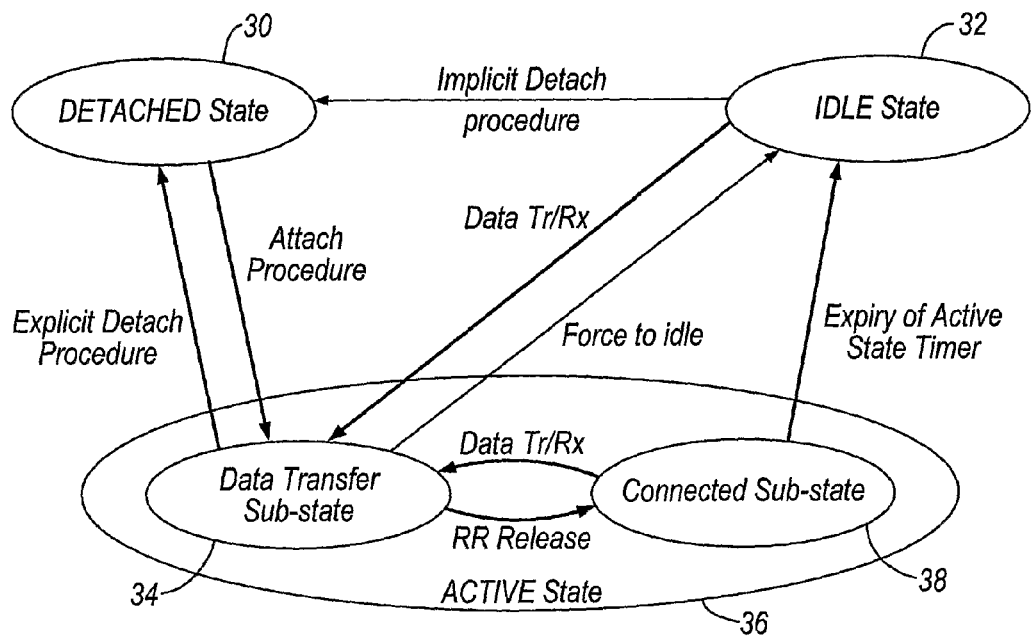
FIG. 3 shows the basic radio/Global Multimedia Mobility states in a mobile terminal.

FIG. 3 shows the Radio/GMM states at the UE 1

When the UE 1 is powered on it starts in DETACHED state 30 and when the UE 1 attaches and activates a PDP context the UE enters IDLE state 32.

When the UE 1 has data to send or receive the UE 1 enters the Data Transfer Sub-state 34 of the ACTIVE state 36. Whilst the UE 1 is sending or receiving data on allocated radio resources the UE 1 remains in Data Transfer Sub-state 34. The AP 20 may force the UE 1 to IDLE state by including the "Force to Idle" indication when releasing the Radio Resources (RR) allocated to the UE 1. Whilst in Data Transfer Sub-state 34 state when the UE 1 stops sending or receiving data, the UE 1 enters the Connected Sub-state 38. Whilst in ACTIVE Sub-states 34,38, the core network knows the location of the mobile to the BTS site (or possibly, URA) level.

The UE 1 stays in the Connected Sub-state for a timer-based period after the last User Plane packet is transferred. A new timer (Connected State Timer) is introduced into the UE 1 and the AP 20 to govern this (whether the timer value is fixed or negotiated—e.g. at PDP context activation is FFS). The AP 20 communicates the size of the Connected State Timer to the UE 1 during the RR SETUP procedure.

Note: this 'Connected state' timer is within the AP 20 and not in the UP-GW 22 or the CP-GW 24. This particularly simplifies procedures when multiple APNs/multiple UP-GWs are in use.

On expiry of the Connected State Timer the UE 1 drops to IDLE state 32. The AP 20 informs the CP-GW 24 that the UE 1 has entered IDLE state 32 and Routeing Area based paging will be required. The AP 20 passes a copy of the latest UE context to the CP-GW 24. The CP-GW 24 informs each of the UP-GWs 22,23 that are in Active state 36 for that UE, that the UE is now in IDLE state 32.

If whilst in the Connected Sub-state 38 the UE 1 sends or receives data to/from the AP 20, the UE 1 re-enters Data Transfer Sub-state 34.

4.2 Basic States at the UP-GW for a UE

Figure 4:
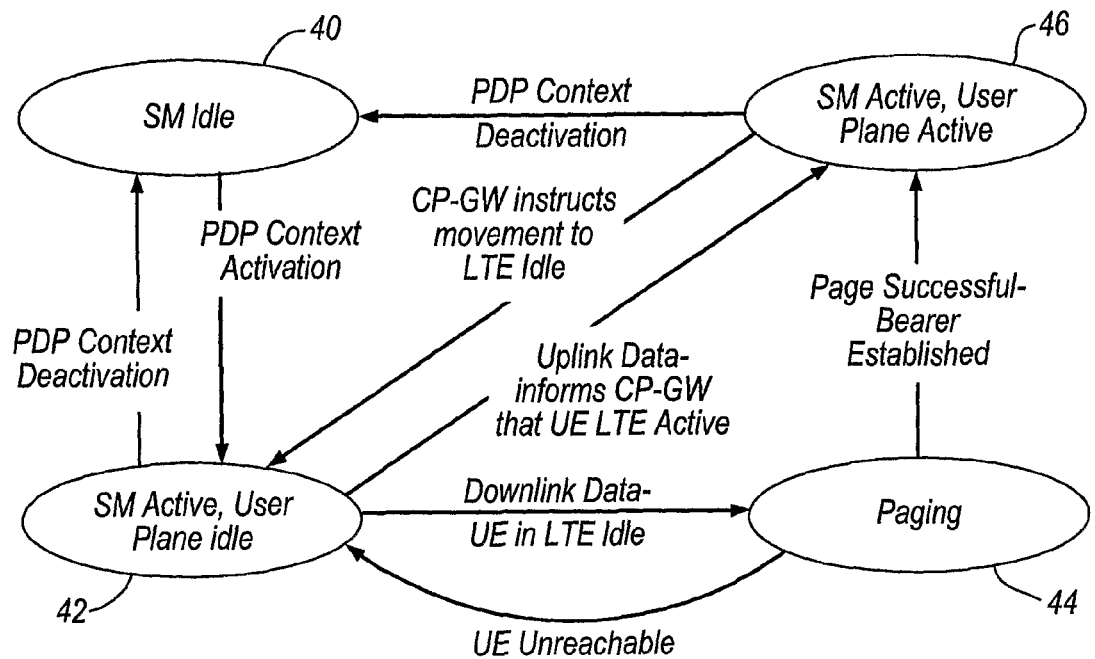
FIG. 4 shows the states in the user plane gateway for each PDP context for a mobile terminal.

FIG. 4 shows States inside the UP-GW 22,23. FIG. 4 illustrates the states in the UP-GW 22,23 for each PDP context for a UE 1. When a UE 1 is first powered up, the UE 1 is in the (Session Management) SM Idle state 40 in the UP-GW 22,23. When the UE 1 or the CP-GW 24 activates a PDP Context, the UE 1 enters the SM Active, User Plane Idle state 42 in the UP-GW 22,23. Upon deactivation of the last PDP context in this UP-GW 22,23, the UP-GW 22,23 enters SM Idle state.

If a downlink packet arrives at the UP-GW 22,23, when there is not an active User plane path to the UE 1, the UP-GW 22,23 starts to buffer the downlink packets, contacts the CP-GW 24 requesting paging to be initiated for the UE 1 and the UP-GW 22,23 enters the Paging state 44.

If an uplink packet arrives at the UP-GW 22,23, the UP-GW 22,23 moves to the SM Active, User Plane Active state 46, and contacts the CP-GW 24 indicating that the User plane is active.

When in the Paging state 44, if the CP-GW 24 notifies the UP-GW 22,23 that the UE 1 was unreachable, the UP-GW 23 returns to the SM Active, User Plane Idle state 42. If the paging of the UE 1 was successfully completed then the user plane will be re-established to the UE 1, and the UP-GW enters SM Active, User Plane Idle state 42.

4.3 Basic States at the CP-GW for a UE

Figure 5:
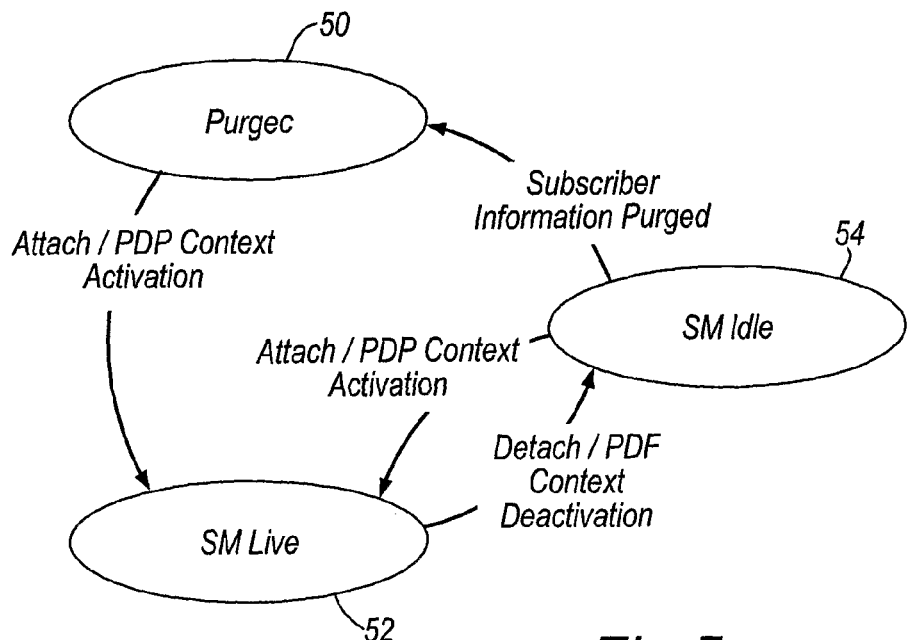
FIG. 5 shows the states in the control plane gateway.

FIG. 5 shows States inside the CP-GW. FIG. 5 illustrates the states in the CP-GW 24 for each UE 1, and they relate to both UE context storage and SM activity.

The Purged state 50 is where the CP-GW 24 does not hold any information about a specific UE 1. When the UE 1 attaches and/or Activates a PDP context the CP-GW 24 gathers UE 1 information from the AAA 26/HLR 10 and the CP-GW 24 enters the SM Live state 52 for this UE 1.

When in the SM Live state 52 the UE 1 has an IP Address allocated. If the last PDP context for the UE 1 is deactivated and the UE 1 detaches then the UE 1 enters SM Idle state 54. The CP-GW 24 may also move from the SM Live state 52 to the SM Idle state 54 when the Guard Timer of the Periodic SM Timer expires.

Whilst in SM Idle state 54 the information about the UE 1 may be purged, in which case the CP-GW 24 would enter the Purged state 50 for this UE 1. If the UE 1 Activates a PDP context then the UE re-enters SM Live state 52.

5 Modifications to GMM and SM Functions 5.1 Modification of the Periodic RAU Procedure For an LTE UE in a network with LTE Gateways, the value of the Periodic Routeing Area update timer assigned to the UE as part of the Routeing Area Update procedure is set to the value that disables the Periodic Routeing Area update functionality in both the UE 1 and SGSN 16. The functions of the Periodic Routeing Area Update procedure are now handled with the new Periodic SM Update procedure.

5.2 Synchronisation of SM Across Access Technologies 5.2.1 General Principles

In the definition of R'99, the concept of a combined 2G/3G SGSN was defined to overcome problems of a large quantity of GMM signalling due to ping-pong between UTRAN and GERAN. Operators already have a large number of GSN nodes in their networks that only support 2G and/or 3G.

In the proposed architecture for the 3GPP system evolution, the concept of the SGSN is lost from the picture. The functions historically homed on the SGSN are being incorporated into a GW function. In the evolved architecture a combined 2G/3G/Evolved3G SGSN-like node will probably place undesirable constraints on the implementation cost/complexity of the Evolved-gateway.

To overcome the issue of ping-pong between access systems, it is proposed that Equivalent Routing Areas be defined in the UE 1, so when the UE 1 moves between the different access technologies this signalling can be avoided. But in allowing these SGSN-like functions to be physically separated, it would either mean that we would need to define handling for duplication of the UE SM contexts or accept that there may be latency issues caused by the SGSN-like function gathering the most up-to-date UE context.

The UE context in the control plane should be relatively static, only being modified when the UE activates, modifies, or deactivates a PDP context.

To avoid problems with maintaining synchronisation of Authentication information for an UE and the routeing of SMS and Location Services information it is proposed that all interactions to the HLR 10/AAA 20 are proxied via the CP-GW 24 of the UE 1.

5.2.2 Attach and Location Change 5.2.2.1 Attach, UE Starting in UTRAN Coverage (CP-GW 24 Provides Equivalent RAIs at ATTACH)

At power on, the UE 1 sends an Attach Request to the SGSN 16. The ATTACH REQUEST contains an indication that the UE 1 is LTE capable, and the UE's IMSI. As a result of the LTE indication, instead of communicating with the HLR/HSS 10, the SGSN 16 selects a CP-GW 24 (according to some FFS load sharing/geographic information/etc algorithm) and sends (MAP) signalling to the CP-GW 24. The CP-GW 24 then signals to the HLR/HSS 10. The 3G-SGSN 16 now uses the CP-GW 24 as a proxy for any future interactions with the HLR 10/AAA 26.

The CP-GW 24 provides the 3G-SGSN 16 with the set of Equivalent RAIs for the UE 1 based on the UE's current location (identified by the Cell ID of the UE 1). The CP-GW 24 possibly informs a separate 2G-SGSN that it should create a profile for this UE 1 associated to the provided RAI. Security procedures are performed and separate P-TMSIs are allocated for UMTS/GSM and LTE access.

The CP-GW 24 then informs the HLR 10//AAA 26 to update the location of UE 1 to point to the CP-GW 24.

The 3G-SGSN 16 passes the ATTACH ACCEPT to the UE 1 including the RAI and Equivalent RAIs and their associated P-TMSIs allocated to the UE 1.

5.2.2.2 Attach, UE Starting in E-UTRA Coverage (CP-GW 24 Provides Equivalent RAIs at ATTACH)

At power on, the UE 1 sends the ATTACH REQUEST message as part of the Attach procedure. The CP-GW 24 receiving the ATTACH REQUEST message gathers the profile for the UE 1 from the HLR/HSS 10.

The CP-GW 24 provides the current RAI and Equivalent RAIs for the UE 1. The CP-GW 24 allocates the Equivalent RAIs for the UE 1, based on the UE's location. The CP-GW 24 communicates with the 3G-SGSN 16, and possibly the separate 2G-SGSN, to obtain P-TMSIs for use in these Equivalent RAIs and to ensure that they should create a profile for this UE 1 associated to the provided RAI.

The CP-GW 24 passes the ATTACH ACCEPT to the UE 1 including the RAI and Equivalent RAIs and P-TMSIs allocated to the UE 1.

5.2.2.3 UE Changes to New Routeing Area 5.2.2.3.1 CP-GW 22,23 Provides Equivalent RAIs at RAU When the UE 1 in IDLE mode changes to a new RA in the E-UTRA system, the UE 1 completes the Routeing Area Updating procedure. The CP-GW 24 may allocate new Equivalent RAI to UE 1 in the acceptance of the Routeing Area Update procedure. The CP-GW 24 may decide to modify the 3G-RAs allocated to the UE 1, and contact the SGSNs directly to possibly move and/or modify the UE context of the UE 1.

When the UE 1 in IDLE mode changes to a new RA in the UTRAN system, the UE completes the Routeing Area Updating procedure. The SGSN 16 does not contact the HLR/HSS 10, instead, the SGSN 16 may contact the CP-GW 24 requesting from the CP-GW 24 a list of new Equivalent RAI for the UE 1. The CP-GW 22,23 may decide to modify the RAIs allocated to the UE 1, and therefore would provide these to the SGSNs. If the RA update is to a new SGSN, the CP-GW 24 may move the context between SGSNs, if allocating the new 3G RAs to the UE 1. The 3G-SGSN 16 then provides the 3G-SGSN the list of Equivalent RAIs to be passed to the UE in the RAU Accept message.

5.2.3 Change of SM Context Information 5.2.3.1 General

A simple approach to ensure low delay at the establishment of UE contexts, would be to make the CP-GW 24 responsible for the synchronisation of the UE contexts between 2G/3G SGSNs and the CP-GW. The quantity of signalling to be passed between nodes should be minimal, because normally the UE Contexts should be relatively static, only changing when PDP contexts are activated, modified or deleted.

To ensure the 2G/3G SGSN knows it has the most up-to-date information, the UE is provided with a Context Reference Number each time UE context information is changed. The UE provides this Context Reference Number to the SGSN when accessing the system, and if this Reference Number does not match the Reference Number of the context information that the SGSN has stored then the SGSN will pull the full UE context information from the CP-GW node.

5.2.3.2 PDP Context Activation 5.2.3.2.1 Activation in E-UTRAN

Figure 6:
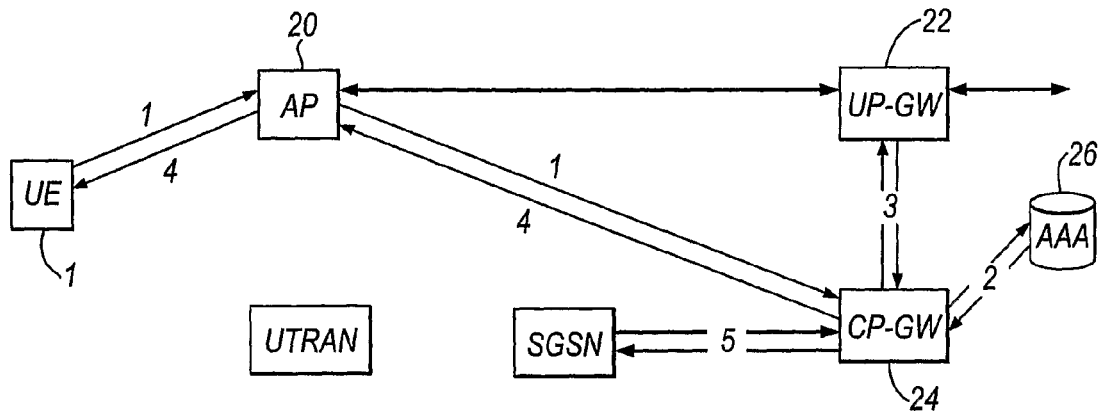
FIG. 6 shows PDP context activation in E-UTRAN.

FIG. 6 shows PDP Context Activation in E-UTRAN. The following messages are generated:

1. The UE sends, via the AP20, the PDP Context Activation message to the CP-GW 24, activating a PDP context.

2. The CP-GW 24 possibly contacts the AAA 26, requesting the subscription information of the UE 1 (however, this is normally not needed—sufficient subscriber data having been downloaded at the time of Attach).

3. The CP-GW 24 based on UE subscription information, e.g. the billing gateway address, and other information provided in/with the PDP Context Activation message, e.g. the APN and the Cell ID of the UE 1, the CP-GW 24 selects the UP-GW 22 to be used for this PDP context. The CP-GW 24 contacts the UP-GW 22 and is provided the TEIDs and IP Address which are to be allocated to the AP20 and also to the UE 1.

4. The CP-GW 24 sends the Tunnel establishment information to the AP20 at the same time as it sends the PDP Context Activation Accept to the UE 1. The PDP Context Accept message also contains the UP-GW 22 tunnel endpoint information so that the UE 1 can rapidly re-establish the data link via a different AP.

5. If the CP-GW 24 has any 2G/3G SGSNs listed in the profile stored for the UE 1, the CP-GW 24 updates the UE specific SM profile stored in the indicated SGSN(s) to include the activated PDP context.

5.2.3.2.2 Activation in UTRAN (or GERAN)

Figure 7:
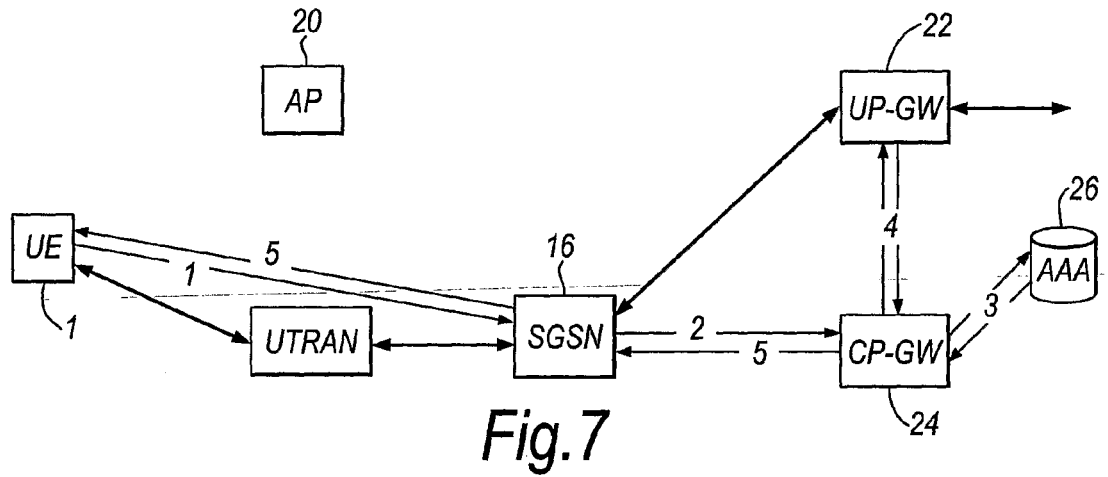
FIG. 7 shows PDP context activation in UTRAN.

FIG. 7 shows PDP Context Activation in UTRAN (or GERAN). The following messages are generated:

1. The UE 1 sends the PDP Context Activation message to the SGSN 16, activating a PDP context.
2. The SGSN 16 sends the Activate PDP context Request message to the GSGN function (CP-GW 24) including the TEID in the SGSN.
3. The CP-GW 24 possibly contacts the AAA 26 for the subscription information of the UE 1.
4. The CP-GW 24 based on UE subscription information, e.g. the billing gateway address, and other information provided in/with the PDP Context Activation message, e.g. the APN and the Cell ID of the UE, the CP-GW 24 selects the UP-GW 22 to be used for this PDP context. The CP-GW 24 contacts the UP-GW 22 and is provided TEIDs and IP Address to be returned to the SGSN. The UP-GW TEID and IP address are also sent to the AP 20.
5. The CP-GW 24 sends the PDP Context Activation Accept to the UE 1, including the relevant information for the UE 1 and passes the SGSN the TEID of the UP-GW 22.

5.2.4 Periodic SM Update

At Attach (and optionally in other SM procedures) the UE 1 is passed the value of the Periodic SM Update Timer that is to be used by the UE 1. This timer ensures that the UE 1 is in regular and/or frequent contact with the CP-GW 24 and informs the node that the UE 1 is still likely to be available for sessions.

When this new timer expires the UE 1 completes the Periodic SM Update Procedure. The Periodic SM Update procedure consists of the UE 1 sending a new Periodic SM Update message to the SGSN (2G or 3G) 16 or CP-GW 24 (if on E-UTRA). The 2G/3G SGSN 16 passes this message transparently to the CP-GW 24. The CP-GW 24 returns an Acknowledgement to the UE 1 (possibly via the SGSN).

The Periodic SM update is performed irrespective of whether or not user plane data transfer has occurred. Signalling to/from the CP-GW 24 restarts the Periodic SM Update timer When the Periodic SM timer expires in the CP-GW 24 and no update has been received from the UE 1, the CP-GW 24 starts a guard timer (a typical value would be 30 minutes). When the guard timer expires, the CP-GW 24 can deactivate any active PDP contexts. While the guard timer is running, or after it has expired, the CP-GW 24 need not page the UE 1.

When arriving back on E-UTRA, UTRAN or GSM coverage after the expiry of the Periodic SM Update Timer, the UE 1 completes an instance of the Periodic SM procedure.

6 Mobility Procedures 6.1 Intra EUTRA Mobility Procedures Whilst in ACTIVE State Depending on the decision of whether uplink soft combining is required, the solution for the handover within EUTRA may be performed in a number of ways. The follow subclauses describe how mobility could be completed between the E-UTRA APs, with or without uplink selective combining.

The CP-GW 24 in each scenario is not informed in a real-time manner of the AP change of the UE 1, with the negotiation of the Radio Resource Allocation being completed directly between APs, and negotiation of transport "resources" being completed between APs and UP-GW(s) 22,23.

In the downlink, the UP-GW 22 starts to bi-cast the User Plane as part of the Handover preparation phase, and continues until the UE 1 has successfully arrived on the target AP.

6.1.1 Handover with Uplink Soft Combining in the UP-GW 22

6.1.1.1 Addition of Uplink Path to Active Set

The Active Set is the set of APs the UE is simultaneously connected to.

Figure 8:
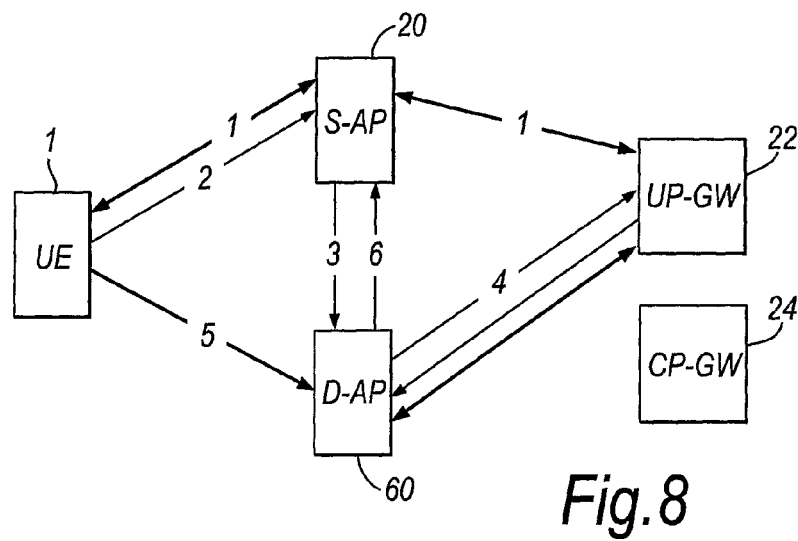
FIG. 8 shows uplink soft handover with the addition of an uplink path.

FIG. 8 shows Uplink Soft Handover with the addition of uplink path to Active Set. The following messages are generated:

1. The User plane passes from UE 1 through the Serving AP (S-AP) 20 to the soft combiner function of the User Plane Gateway (UP-GW) 22.
2. The UE 1 passes Measurement Reports to the S-AP 20 on the suitable neighbour cell within a Drift AP (D-AP) 60.
3. The S-AP 20 decides that it would be better to include one cells of the D-AP 60 reported by the UE 1 to the Active Set of Receivers for the UE 1. The request includes the Address of the UP-GW 22 and sufficient UE information to allow the new D-AP 60 to receive the transmissions of the UE 1 and create a User Plane to the UP-GW 22.
4. The UP-GW 22 is informed that it should also accept packets for this UE 1 from the new Drift AP 60. (This indication could come from either the D-AP 60 or the S-AP 20.)
5. The D-AP 60 starts to capture the User Plane packets transmitted by the UE 1, and passes the packets along with an indication of how error free they are (e.g. 'perfect' or 'good') to the UP-GW 22. Any packets that are deemed to contain too many errors are not passed to the UP-GW 22.
6. The new AP 60 provides the Serving AP 20 with the list of Neighbour AP, to be transmitted to the UE 1 and periodically provides an indication of reception quality for the UEs uplink transmissions.

6.1.1.2 Serving AP Relocation with Downlink Hard Handover

The user plane bearer is established and released using dummy packets on the user plane connection. The dummy packets instruct the UP-GW 22 to which AP to send data packets. Dummy data packets are used in this way because there is no control plane connection to the new AP. The new AP and the UP-GW establish the radio interface, rather than the CP-GW.

In this proposed architecture, when the Serving AP wishes to move the "serving" function to a Drift AP, S-AP relocation is triggered. Due to the AP being "just one cell site", it is likely that Serving AP Relocation will need to be performed when all uplink bearer paths are not through a single AP. This procedure is completed after completing uplink soft handover.

Figure 9:
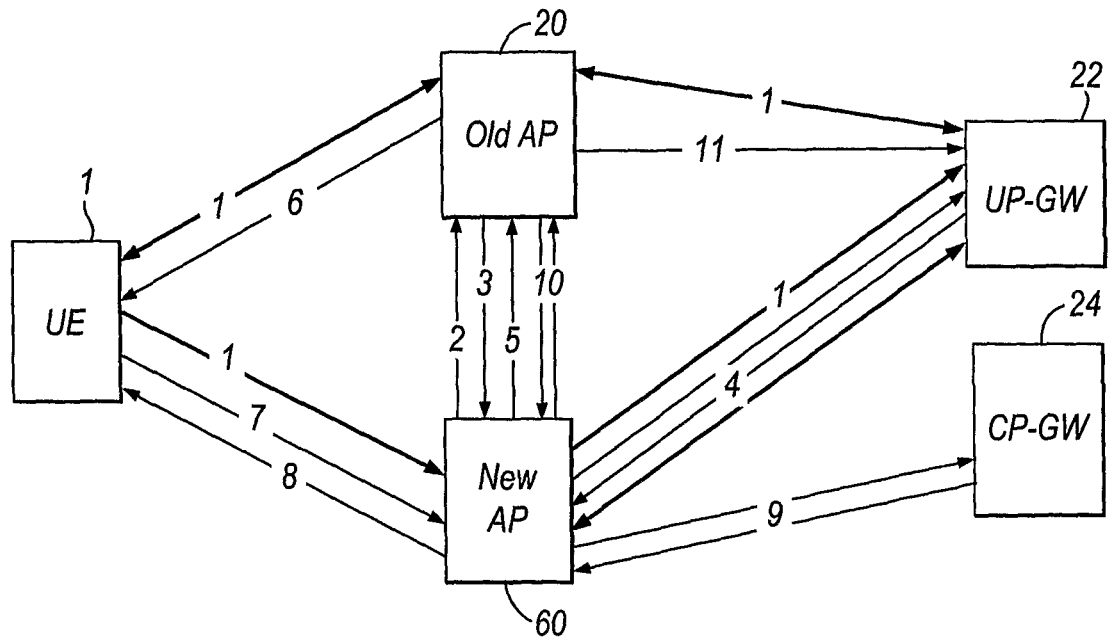
FIG. 9 shows uplink soft handover with serving access point relocation with downlink hard handover.

FIG. 9 shows Uplink Soft Handover—Serving AP relocation with Downlink Hard Handover. The following messages are generated.

1. The Downlink User Plane passes from the UP-GW 22 to the UE 1 via the Old AP 20. The Uplink User Plane passes to the UP-GW 22 via both the Old AP 20 and the New AP 60.
2. The New AP 60 provides the Old AP 20 with radio link quality reports of the received Uplink User Plane.
3. The Old AP 20 calculates that it would be better for the New AP 60 to be controlling the UE 1, so requests the New AP 60 to take control of the UE 1. This Relocation Request includes the UE context (e.g. ciphering and integrity information, TEIDs etc), as well as a list of D-AP that are currently providing an Uplink Path for the Active Set of the UE 1.

4. The New AP 60 requests the downlink User Plane from the UP-GW 22 by sending a dummy uplink packet, with an add bearer path indication, to the TEID allocated to the PDP context of the UE 1. The UP-GW 22 bi-casts the downlink packets to the New and Old APs. Upon receiving packets for the Downlink User Plane from the UP-GW 22, the New AP 60 can transmit these packets on the assigned radio resource in the downlink.

5. The New AP 60 allocates the UE radio resources on the AP and creates an RR Relocation Command to be passed to the UE 1 and sends this to the Old AP 20. If there are any other D-AP in the Active Set of the UE 1, then the Old AP 20 provides this RR Relocation Command to the other D-AP to allow these APs to modify their Radio configurations (if needed)

6. The Old AP 20 sends the Relocation Command message to the UE 1.

7. The UE 1 connects to the New AP 60 on the assigned radio resources.

8. The New AP 60 acknowledges to the UE 1 that the Relocation has been successfully completed.

9. The New AP 60 informs the CP-GW 24 that this AP 60 now controls the UE 1. If there were any D-AP 60 in the Active Set then the New AP now requests these AP to provide Measurement reports to the New AP 60.

10. The New AP 60 signals to the Old AP 20 that the Relocation was successfully completed and that the Old AP 20 can now release the bearer path to the UP-GW 22, the CP-GW 24 and the D-APs. The Old AP 20 sends the new AP 60 the list of unacknowledged packets.

11. The Old AP 20 sends a dummy uplink packet to the UP-GW 22 for the TEID for the PDP context, with a flag indicating that this path can be released. Note: At the end of this procedure, the UE 1 may need to complete a RAU.

6.1.1.3 Removal of Uplink Path from Active Set

Figure 10:
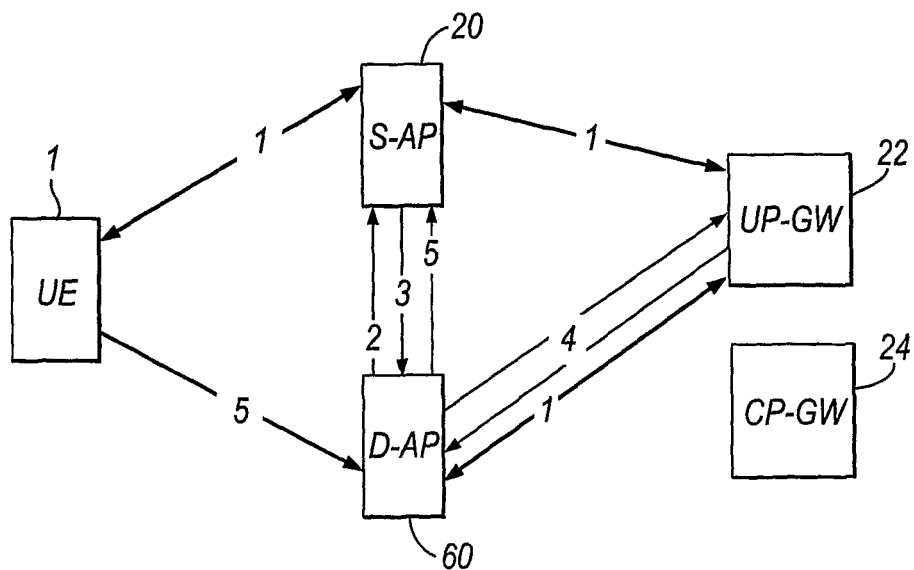
FIG. 10 shows the removal of the uplink path.

FIG. 10 shows Uplink Soft Handover—Removal of uplink path from Active Set. The following actions are performed:

1. The Downlink User Plane passes from the UP-GW 22 to the UE 1 via the Serving AP 20. The Uplink User Plane passes to the UP-GW 22 via both the Serving AP 20 and the Drift AP 60.

2. The New AP provides the Old AP radio link quality reports of the received Uplink User Plane.

3. The S-AP 20 calculates that there is limited benefit of this D-AP 60 being part of the Active Set and therefore instructs the D-AP 60 to drop itself from the active set. The S-AP 20 passes the associated RRC command to the UE 1.

4. The D-AP 60 closes the User Plane path between the D-AP 60 and the UP-GW 22 and releases its radio resources.

5. The D-AP 60 acknowledges that the AP has been successfully removed from the Uplink User Plane.

6.1.2 Hard Handover

Figure 11:
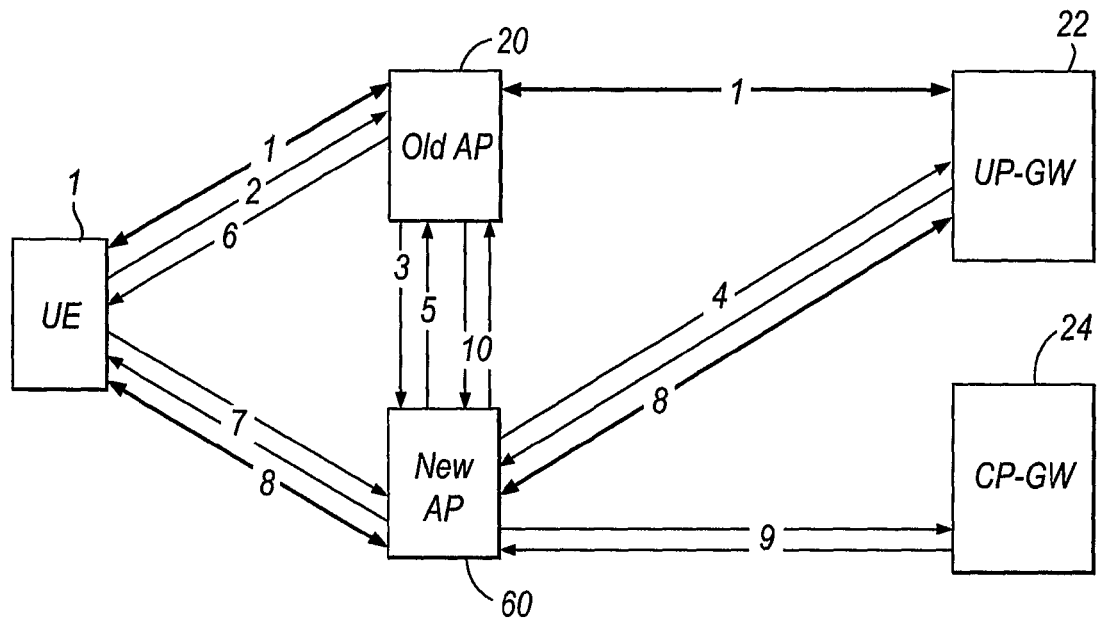
FIG. 11 shows hard handover.

FIG. 11 shows Hard handover. The following actions are performed:

1. The User plane passes from UE 1 through the Old AP 20 to the User Plane Gateway (UP-GW) 22.

2. The UE 1 sends Measurement Reports to the Old AP 20 about the neighbouring APs.

3. The Old AP 20 decides that it would be more radio resource efficient to request one of the AP reported by the UE 1 to receive the transmissions of the UE 1. The request includes a copy of the profile for the UE 1 e.g. the address of the UP-GW 22, ciphering information, etc.

4. The new AP 60 sends a dummy uplink packet to the UP-GW 22 including an indicating that a new bearer path should be added to the list of downlink paths. The UP-GW 22 bi-casts the downlink packets to the new and old APs 20,60. The new AP 60 can start passing any uplink IP packets from the UE 1 to the UP-GW 22.

5. The New AP 60 allocates the UE 1 radio resources and creates an RR Relocation Command to be passed to the UE 1 and sends this to the Old AP 20. The new AP 60 can start to blindly transmit the downlink User Plane on the allocated radio resource.

6. The Old AP 20 sends the RR Relocation Command message to the UE 1.

7. The UE 1 connects to the New AP 60 on the assigned resources, and the New AP 60 acknowledges to the UE 1 that the Relocation has been successfully completed.

8. The user plane passes from UE 1 through the New AP 60 to the User Plane Gateway (UP-GW) 22.

9. The New AP 60 contacts the CP-GW 24 and indicates that the AP 60 now controls the UE 1. The mobility is controlled by the APs, and then they inform a mobility controller after the mobility procedure has been triggered.

10. The New AP 60 informs the Old AP 20 that the UE context stored in the Old AP 20 can now be deleted. The Old AP 20 sends New AP 60 the downlink packets which are unacknowledged by the UE 1.

11. The old AP 20 deletes the connection to the UP-GW 22.

6.2 Inter-RAT, UE Initiated Mobility Procedures Whilst in 'Connected' States 6.2.1 UTRAN to EUTRA Reselection Whilst in 'Connected' States 6.2.1.1 General Principles This solution to allow a UE 1 signalling-free transition between UTRAN and EUTRA coverage relies on the following principles:

The UTRA-RNC is aware that this UE 1 and other parts of the Network are EUTRA capable.

The UP-GW 22 keeps a flag indicating which was the last user plane path to be active, i.e. was the UE 1 passing packets on the E-UTRA or through an 2G/UTRA SGSN, and this is used by the UP-GW 22 to control the paging procedure.

If the UE 1 that was in UTRAN Registration Area Paging Channel in (URA_PCH) returns to UTRAN coverage after having been in EUTRA coverage and the UE 1 has changed URA, the UE performs the URA update procedure.

6.2.1.2 UTRAN to EUTRA Reselection Whilst in 'Connected' States

The following procedure describes a UE 1 reselecting to E-UTRA whilst the UE is in URA_PCH state.

Figure 12:
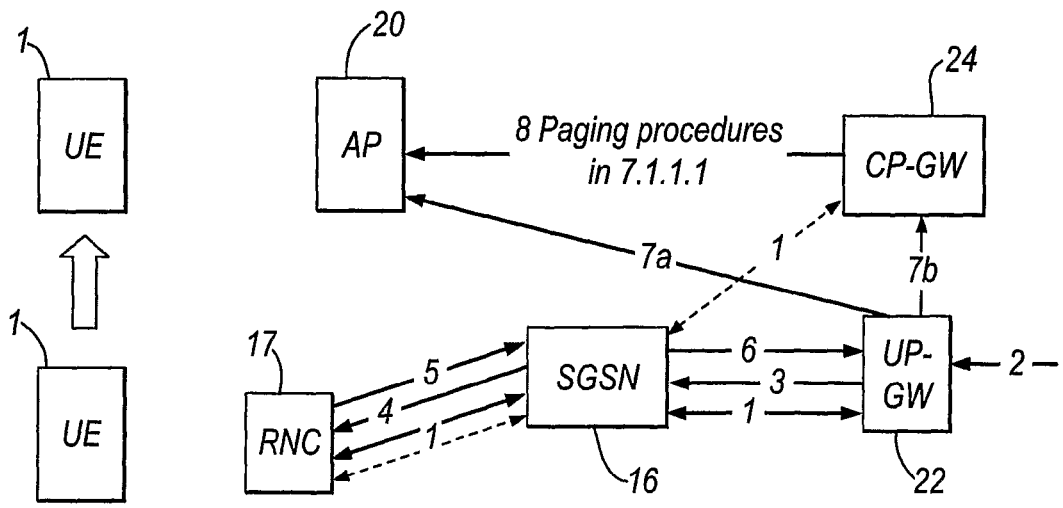
FIG. 12 shows UTRAN to E-UTRA reselection whilst in connected states.

FIG. 12 shows UTRAN to EUTRA reselection whilst in 'connected states'. The following actions are performed:

1. The UE 1 is in URA_PCH, with an Iu connection established, and the UE 1 reselects to EUTRA coverage (without the RNC 17 issuing any command, or, being informed by the UE 1). The UE 1 does not inform the E-UTRA AP 20 (provided that the mobile is registered in the E-UTRA AP's tracking area).

2. A downlink packet is received at the UP-GW 22 for the UE 1.

3. The UP-GW 22 has two flags associated with the PDP context. One indicates whether the UE 1 is in LTE-active or not. The other indicates whether the last "GTP-U tunnel" to be used was on E-UTRA or on UTRA/2G.

a. If the flags indicate "not LTE-Active" and that the last active GTP-U tunnel is that to the SGSN 16, the UP-GW 22 passes the packet down this tunnel to the SGSN 16.

b. If the flags indicate that the UE 1 is not in "LTE-Active" and that the last used "tunnel" was to E-UTRA, then, the UP-GW 22 requests the CP-GW 24 to page for the UE 1. The UP-GW 22 also passes a copy of the downlink packet, with a flag indicating it is for the purposes of paging, on the GTP-U tunnel to the SGSN 16. If the CP-GW 24 knows that the UE 1 is actively passing data on a different PDP context/different UP-GW 22 then the CP-GW 24 will contact this AP 20 directly.

4. The SGSN 16 passes the packet down the Iu interface to the RNC 17. If the SGSN 16 received the "paging flag" from the UP-GW 22, then this is passed to the RNC 17.

5. Upon receiving the user plane packet for a UE 1 in URA_PCH (or CELL_PCH), (and when the RNC 17 knows that both the UE 1 and the network are EUTRA capable), then:

if the "paging flag" was ABSENT, the RNC 17 returns a copy of the user plane packet to the SGSN 16 with a 'wider paging required' flag for this UE 1, and the RNC 17 initiates normal paging for the mobile in URA_PCH (or Cell_PCH). If the UE 1 does not reply then the RNC 17 maintains the Iu connection. If the UE 1 replies, and the "paging flag" was present, the RNC 17 asks the SGSN 16 to inform the CP-GW 24 that the packet has been delivered successfully.

If the RNC 17 receives the user plane packet with the "paging flag" for a UE 1 in (Dedicated Channel) CELL_DCH or CELL_FACH (Forward Access Channel), the RNC 17 passes the packet to the UE 1, and, asks the SGSN 16 to inform the CP-GW 24 that the packet has been delivered successfully.

6. The SGSN 16 passes the copy of the packet up to the UP-GW 22 along with the 'wider paging required' flag.

7. The UP-GW 22 receives the returned packet from the RNC 17 including the indication that wider paging is required.

a. If the UP-GW 22 has an alternative GTP-U connection, i.e. to an AP 20, then the UP-GW 22 forwards this packet down that GTP-U connection.

b. If no other GTP-U connection exists then the UP-GW 22 indicates to the CP-GW 24 that the paging for this UE 1 is required.

8. Paging procedures are initiated by the CP-GW 24 as defined in 7.1.1 (without step 2).

Note: Similar procedures can be used for mobiles in 2G coverage and/or in PMM-IDLE with the SGSN 16 responding directly to UP/CP-GWs.

6.2.2 EUTRA to UTRAN, UE Initiated Reselection Whilst in ACTIVE State

This section assumes that, while in LTE-active state, there is a sub-state that permits the UE 1 to autonomously reselect other cells/RATs. (Note that sudden loss of E-UTRA coverage at a corner, etc, means that such transitions cannot be totally prevented.)

If the UE 1 reselects from EUTRA to UTRAN coverage (without any signalling to/from the E-UTRA network) whilst in LTE-active state, then, the UE 1 completes the following (new) SM update procedure. This indicates that the UE 1 has switched and allows the Iu connection to be built in the new system.

Figure 13:
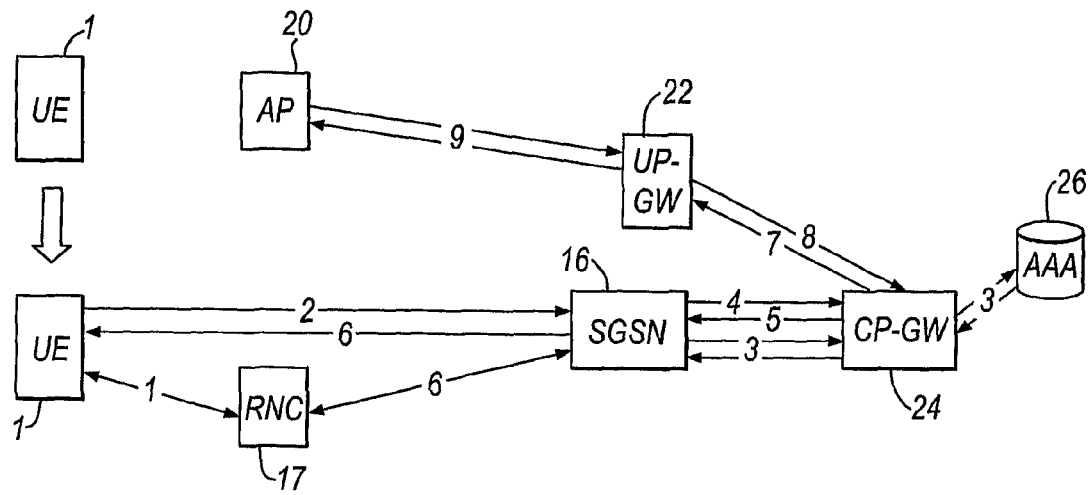
FIG. 13 shows E-UTRA to UTRAN reselection whilst in the LTE-ACTIVE state.

FIG. 13 shows EUTRA to UTRAN reselection whilst in LTE-ACTIVE state. The following actions are performed:

1. The UE 1 leaves a E-UTRA cell while in LTE-Active and reselects a UTRA cell. If the UE 1 is updated in that URA, the UE requests the re-establishment of the RRC (Radio Resource Control) connection, otherwise it requests the setup of an RRC Connection.

2a. If the UE 1 has changed to a new RA outside of the list of equivalent RAs assigned to the UE 1, then the UE 1 initiates the Routing Area Update procedure to the SGSN 16.

2b. If the UE 1 has reselected a cell which is part of an RA that falls within the list of equivalent RAs, the UE 1 sends a SM Update message to the SGSN 16.

3. If necessary, the SGSN 16 completes the RA update procedure (proxying via the CP-GW 24) and/or retrieves UE context information from the CP-GW 24.

4. The SGSN 16 passes the SM Update Request message to the CP-GW 24.

5. The CP-GW 24 sends the SM Update Response message to the SGSN 16 informing the SGSN 16 that the context for UE 1 is still active.

6a. The SGSN 16 sends a Routeing Area Update Accept message to the UE 1. The SGSN 16 may maintain the Iu connection for the UE 1.

6b. The SGSN 16 responds to the UE 1 with the SM Update Accept message. The SGSN 16 may maintain the Iu connection for the UE 1.

7. The CP-GW 24 informs the UP-GW 22 that the UE 1 is now active on UTRA.

8. The UP-GW 22 sets its flags to "not LTE-Active" and 'last data transferred' is set to "SGSN". The UP-GW 22 acknowledges the command from the CP-GW 24.

9. The UP-GW 22 releases the connection to the AP 20, including a cause indicating that the Connection is no longer required due to movement to UTRA.

7 Procedures for Data Flow Establishment 7.1 Downlink Data Transfer 7.1.1 Transfer from Idle to Active States, UE on E-UTRA, UTRA or 2G System When downlink packets are received at the UP-GW 22 and the UE 1 is in LTE-Active state, a connection between the UP-GW 22 and the AP 20 may already exist for the UE 1. In this case, the UP-GW 22 sends the packets directly to the AP 20.

After the expiry of the LTE-Active State Timer in the AP 20, the AP 20 and UP-GW 22 release the connection between them for that LTE 1. No user plane transmission path for the UE 1 exists for future packets received in the downlink. When a downlink packet arrives the procedure described below is applied:

Also, the UE 1 may be in LTE-Active state as a result of signalling between UE 1 and the core network and/or data transmission through a different UP-GW 22. In this case, a 'disconnected' UP-GW 22 acts as described below when a downlink packet arrives.

The User Plane Gateway UP-GW 22 has two flags associated with the "PDP context". One indicates whether the UE 1 is in "LTE-active or not". The other indicates whether the last "GTP-U tunnel" to be used was "on E-UTRA or on UTRA/2G".

Figure 14:
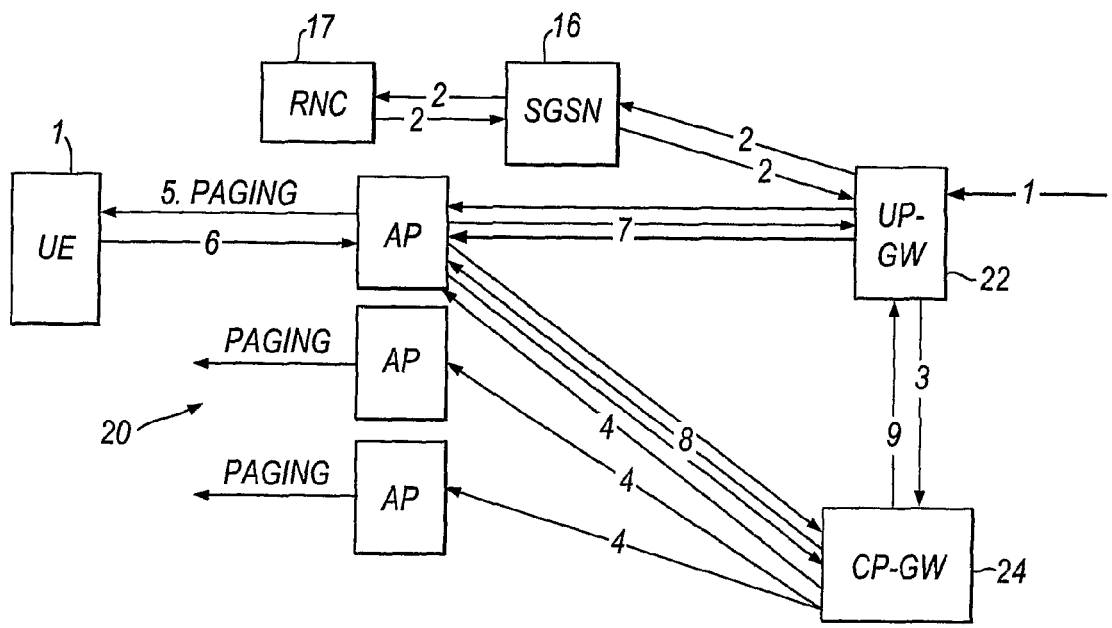
FIG. 14 shows the transfer from idle to active states by a mobile terminal caused by downlink traffic whilst in E-UTRA coverage.

FIG. 14 shows Transfer from Idle to Active states for UEs caused by downlink Traffic whilst in EUTRA coverage. The following actions are performed:

1. A downlink packet is received in a UP-GW 22 function and the "LTE-active or not" flag indicates "not".

2. If the "last used tunnel" flag in the UP-GW 22 indicates that the UE 1 was last in the coverage of the SGSN, then the UP-GW 22 sends the downlink packet to the UTRA/2G SGSN.

A. When received by a 2G-SGSN;
  I. If the UE 1 (or MS in 2G terminology) is in the Ready state then the SGSN sends the packet to the base station (BSS)
  II. If the UE 1 is in the Standby state, then the SGSN 16 initiates paging for the UE 1 and immediately returns a copy of the Packet to the UP-GW 22 with an indication that parallel "paging in a wider area" is required. Once the 2G paging process has been completed, the SGSN returns an indication to the UP-GW 22 of whether the UE 1 was reachable or not (in 2G coverage).
B. When received by a 3G-SGSN:
  I. If an Iu connection to the LTE 1 exists, the SGSN forwards this packet to the RNC 17 on the Iu connection. If the UE 1 is in URA_PCH or CELL_PCH, the RNC immediately returns a copy of the packet to the UP-GW 22, via the SGSN, with an indication that parallel "paging in a wider area" is required, and, in parallel initiates paging in the URA/CELL. Once the UTRA paging process has been completed, the RNC 17 sends, the UP-GW 22 an indication of whether the UE 1 was reachable or not.
  If the UE 1 is in Cell_DCH, the packet is delivered to the UE 1.
  II. If an Iu connection for this UE 1 does not exist, the SGSN immediately returns a copy of the packet to the UP-GW 22 with an indication that parallel "paging in a wider area" is required, and, the SGSN initiates paging for this UE 1 in UTRA. Once the paging process has been completed, an indication of whether the UE 1 was reachable or not is sent to the UP-GW 22.
3. When receiving a downlink packet from the Gi interface when the "last used tunnel" flag in the UP-GW 22 indicates that the UE 1 was last in EUTRA coverage (and the "LTE-Active or not" flag is set to "not"), then, the UP-GW 22 will contact the CP-GW 24 requesting paging to be initiated for this UE 1.
Also, if the UP-GW 22 receives a copy of a packet from an RNC/3G SNSG/2G SGSN 16 with a request for "paging in a wider area" the UP-GW 22 will contact the CP-GW 24 requesting paging to be initiated for this UE 1 in other areas.
4. The CP-GW 24 sends a Paging message to all the APs 20 and SGSN 16 which are part of RAs that have been allocated to the UE 1 (and which are not yet paging the UE 1 including the parameters needed to page the UE 1 (c.f. IMSI in 2G/3G).
5. The UE 1 is paged on each of the E-UTRA, UTRA and 2G Cells that are contained within the list of Equivalent RAIs allocated to the UE 1.
6. When the UE 1 receives the Paging message it responds with the Service Request/Cell Update message (or E-UTRA equivalent). In EUTRA this message contains enough information for the AP 20 to gather the context for the UE 1 (either directly from the last registered AP 20 or from the CP-GW 24). In UTRA/2G, the SGSN 17 indicates to the CP-GW 22 that the UE 1 has responded to paging.
7. The AP 20 (or SGSN 16) then creates the connection to the UP-GW 22 (via the CP-GW 24 in the case of an SGSN 16). When the connection is created to the UP-GW 22 the IP packet buffered for the UE 1 is sent on the connection to the AP 20 (or SGSN 16).
8. The AP 20 informs the UP-GW 22 that it controls the UE 1, and the CP-GW 22 passes the QoS information to the AP 20 for this flow.
9. The CP-GW 24 informs the UP-GW 22 that the Paging procedure to locate the UE 1 was successfully completed.

Figure 15:
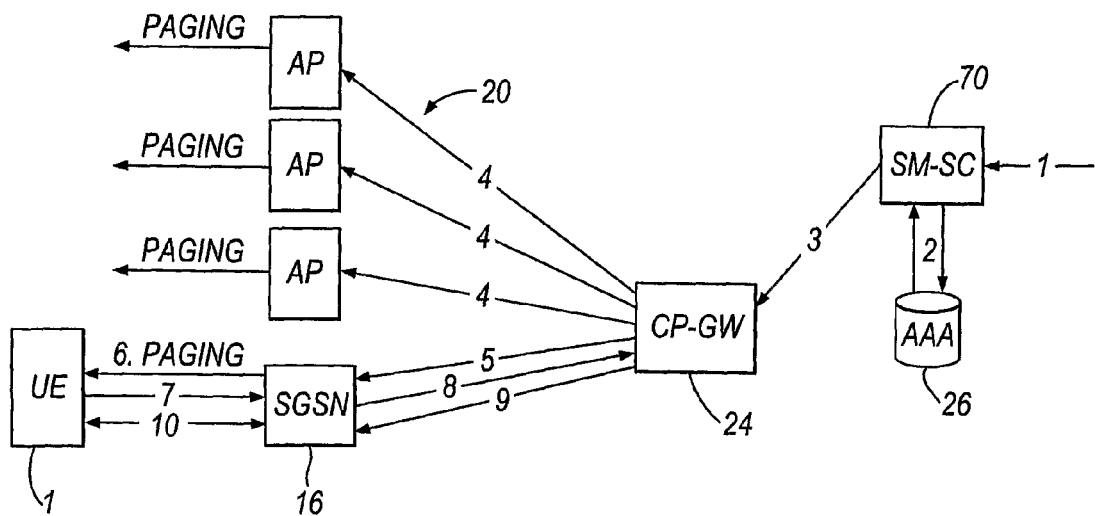
FIG. 15 shows a mobile terminated SMS on UTRA.
Figure 16:
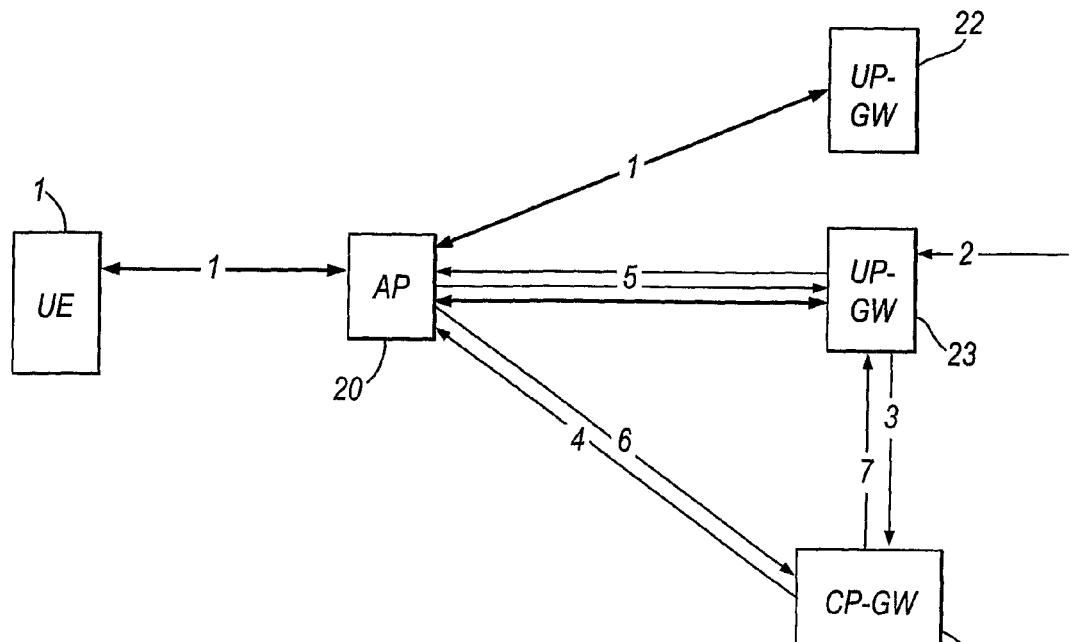
FIG. 16 shows a mobile terminal in an active state in a E-UTRA system with some user plane gateways inactive.

7.1.1.2 Mobile Terminated SMS on UTRA
  The concept to proxy interactions between the 2G and 3G SGSNs 16 via the CP-GW 24, means that it is up to the CP-GW 24 to manage the termination of SMS traffic to a UE 1. This process is also applicable for Location Services.
  FIG. 15 shows Mobile Terminated SMS on UTRA
1. The Short Message Service Centre (SM-SC) receives an SMS for the UE 1.
2. The SM-SC 70 requests the HLR/HSS 10 to send routing information to allow the SMS to be delivered to the correct controlling node for this UE 1. The HLR/HSS 10 returns the CP-GW 24 address (and possibly the address of VMSC).
3. The SM-SC 70 sends the Forward Short Message to the CP-GW 24.
4. If the CP-GW 24 knows that the UE 1 is in LTE-Active, the CP-GW 24 sends the SMS as a signalling message to the UE 1.
  If the UE is "not in LTE-Active", the CP-GW 24 sends a Paging message to all the APs 20 which control cells which form part of RAs that have been allocated to the UE 1.
5. For a UE 1 that is "not in LTE-Active", the CP-GW 24 also sends a Notification message to the SGSN-3G and/or SGSN-2G that control RAs that have been allocated to the UE 1.
6. The UE 1 is paged on each of the AP 20 and Cells that are contained within the list of Equivalent RAIs allocated to the UE 1 during the last instance of the Routeing Area Update Procedure.
7. When the UE 1 receives the Paging message it responds with the Service Request message to the SGSN 16.
8. The SGSN 16 upon receiving the Service Request contacts the CP-GW 24, informing the CP-GW 24 that contact has been made with the UE 1.
9. The CP-GW 24 forwards the Forward Short Message to the SGSN 16.
10. The SMS is passed to the UE 1 using the normal procedures.
7.1.2 UE in Active State
7.1.2.1 UE on E-UTRA System
  Although it is desirable that each UE only uses one APN, this may be difficult to achieve (eg due to the need for dual stack IPv4/IPv6 and/or the interactions of public services such as MMS/IMS with corporate APNs). Hence the architecture needs to be able to support multiple APNs, and, their hosting on physically separate nodes.
  The following is a description of how the downlink data flow is restarted over an "inactive" PDP context when the UE is active on a PDP context on another APN/UP-GW.
  FIG. 16 shows UE 1 in Active State on E-UTRA system—but some UP-GWs are "inactive"
1. The UE 1 is in LTE-ACTIVE due to data transfer on one APN 20. The UE's PDP context for this APN uses UP-GW1 22.
2. A downlink packet is received by the UP-GW2 24. UP-GW2 23 supports a PDP context for a different APN for the UE 1.
  Note: when using different APNs, this procedure applies even if UP-GW1 22 and UP-GW2 23 are the same physical node.
3. When receiving a downlink packet from the Gi interface, for a UE 1 where no downlink transmission path exists and where the last user path flag in the UP-GW 23 indicates that the UE 1 was last in E-UTRA coverage, the UP-GW 23 signals to the CP-GW 24 requesting paging to be initiated for this UE 1.
  If the UE 1 was last 'active' with this UP-GW 23 while in UTRA or 2G, the UTRA/2G equipment will return a copy of the packet to the UP-GW 23 with a request to "page in a wider area". The UP-GW 23 then signals this to the CP-GW 24.

4. If the UE 1 is active on a different PDP context then the CP-GW 24 sends a notification message to the AP 20 where the UE 1 is currently active, including the TEID and IP address for the UP-GW 23 for this PDP context and the QoS information for this Flow.

5. The AP 20 then creates the connection to the UP-GW 23 and allocates any necessary radio resources. The AP 20 sends a dummy uplink block to the TEID of the UP-GW 23 which is understood by the UP-GW 23 to be a paging response. The IP packets buffered for the UE 1 are passed on this connection to the AP 20.

6. The AP 20 informs the CP-GW 24 that it controls the UE 1.

7. The CP-GW 24 informs the UP-GW 23 that the Paging procedure to locate the UE 1 was successfully completed.

7.1.2.2 UE on UTRA System

If the UE 1 was "last active on UTRA/2G" and the UE 1 is still active in UTRA/2G via another APN, the UP-GW 22 forwards the packet to UTRA/2G and the data is delivered.

If the UE 1 was "last active on E-UTRA" but the UE 1 is now active in UTRA/2G via another APN, the UP-GW 22:

sends a request to the CP-GW 24 to initiate paging in E-UTRA, and, sends a copy of the packet to the 2G/3G SGSN 16 (or RNC 17 in the case of a single GTP tunnel) indicating that paging may be needed.

The UTRA/2G access then delivers the packet to the UE 1, and, returns an indication to the UP-GW 22 that the UE 1 is reachable.

The UP-GW 22 changes its internal flag to indicate that the mobile was "last active on UTRA/2G", and, informs the CP-GW 24 that the UE 1 is reachable.

7.2 Uplink Data Transfer

7.2.1 General

When the UE 1 is in the ACTIVE states in E-UTRA the UE 1 needs to be able to send data on any APN allocated to it.

This can be achieved by giving the UE 1 a copy of the UP-GW's 22 IP address and TEID when the PDP context is activated.

When the UE 1 first enters Active state with an AP, the UE 1 gives the AP the address of the UP-GW 22 and the TEID for the APN over which the UE 1 wishes to transfer data. This information is encrypted, but, the UE 1 also sends the AP information on where to obtain the decrypting keys (eg from the last used AP).

The AP is then able to open the connection with the UP-GW 22 and send the UE's data. The AP then informs the CP-GW 24 that the UE 1 is in LTE-Active.

Later on, the UE 1 may wish to send data on a different APN. To do this the UE 1 informs the AP of the other APN's UP-GW 23 address and TEID, and, the AP allocates a separate radio flow identity for the UE 1 to use to transfer this data.

7.2.2 Transfer from Idle to Active States

7.2.2.1 When in E-UTRA

When the UE 1 has data to send for an Activated PDP context, the AP needs to ensure the fast reconnection of the User Plane for the UE 1.

Figure 17:
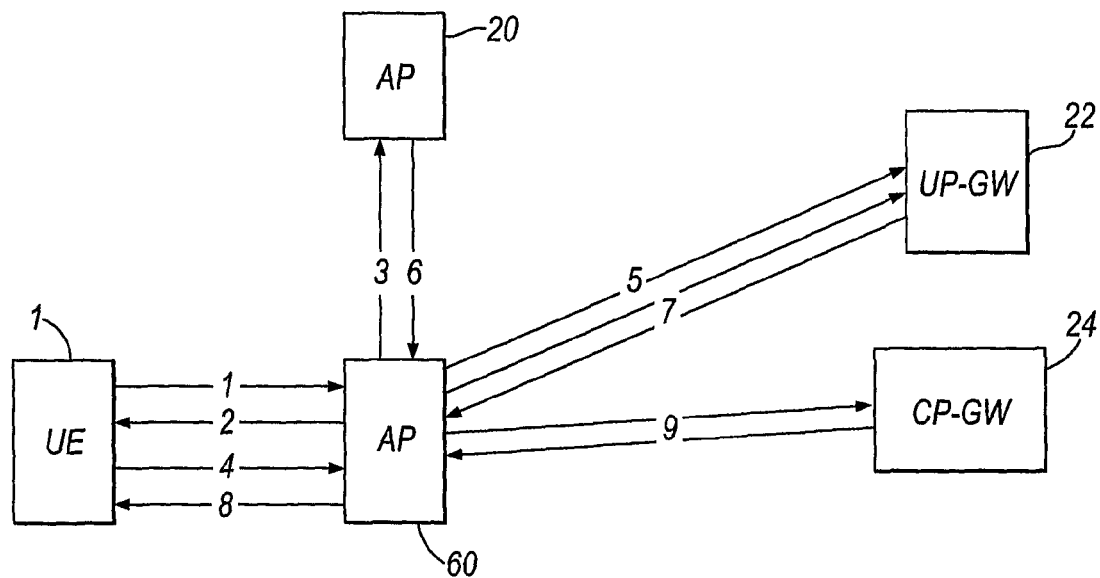
FIG. 17 shows the movement from the idle to active states when a mobile terminal is in a E-UTRA system.

FIG. 17 shows Movement from Idle to Active States when in E-UTRA

1. The UE 1 requests the AP 60 for a Radio Bearer to be established and includes the address of the GW 22 to which the connection is needed, the Radio Level identifier of the UE 1, and an identifier of the last AP 20 controlling the UE 1.

2. The new AP 60 allocates uplink resource to the UE 1 to send limited Uplink packets (e.g. to allow the transmission of an HTTP GET message), 3. If the AP 60 was not the last AP where the UE 1 had completed activity, then the AP 60 requests the profile of the UE 1 from the last AP 20. If the profile is not available then the AP 60 requests the UE 1 to supply its P-TMSI and CP-GW 24 identifier (either a distinct field allocated at RA update, or, derived from the P-TMSI (c.f. Iu-flex)). The AP 60 the contacts the CP-GW 24 and requests the profile of the user identified with the P-TMSI+GW identifier.

4. If the profile was retrieved from the old AP 20, the UE 1 sends packets on the assigned uplink radio resources.

5. The AP 60 forwards the packets to the UP-GW 22 identified by the address provided in the initial Radio Bearer Establishment request (message 1).

6. The old AP 20 provides the UE 1 profile stored in the old AP 20 to the new AP 60.

7. The AP 60 re-establishes the connection to the UP-GW 22 function identified by the UE profile.

8. The AP 60 allocates the UE 1 radio resource in line with the QoS negotiated when the PDP context was activated.

9. The AP 60 indicates to the CP-GW 24 that the UE 1 has entered ACTIVE state with that AP 60, and any data/signalling should be passed directly to the AP 60.

7.2.1.2 When in UTRAN

A similar approach can be used to speed up connection establishment process of the legacy 3G system.

During the RRC Setup procedure, if the UE 1 included the old RNTI, a ciphered signature and an indication of the connection required, in the RRC Setup Complete message. The RNC 17 could then search its data storage for the old profile information of the UE 1. If the RNC 17 finds old information about this UE 1, the RNC 17 verifies the information about the UE 1 using the ciphered signature.

If the information is found the RNC 17 initiates the establishment of an Iu connection for the UE 1, otherwise the RNC 17 performs the normal connection procedures.

8 Other Procedures

8.1 Expiry of Active State Timer at AP/Leaving Active State

The process by which the UE and AP leave Active state is timer rather than signalling driven. The timer is the UE 1 is allocated to the UE 1 by the network. To ensure that downlink traffic is not lost, the AP 20 uses a slightly shorter timer, and, the UE 1 is required to respond to E-UTRA paging that contains any of its identities (P-TMSI, IMSI, E-UTRA-RNTI, and possibly, IMEI).

On expiry of its Active state timer, the AP 20 indicates to the CP-GW 24 that the UE 1 has entered Idle state and hence paging of the whole RA(s) is required. The AP 20 releases the associations to the UP-GWs 22,23 which this UE 1 has used, thus indicating to the UP-GW(s) 22,23 that paging is now required for this UE 1.

Figure 18:
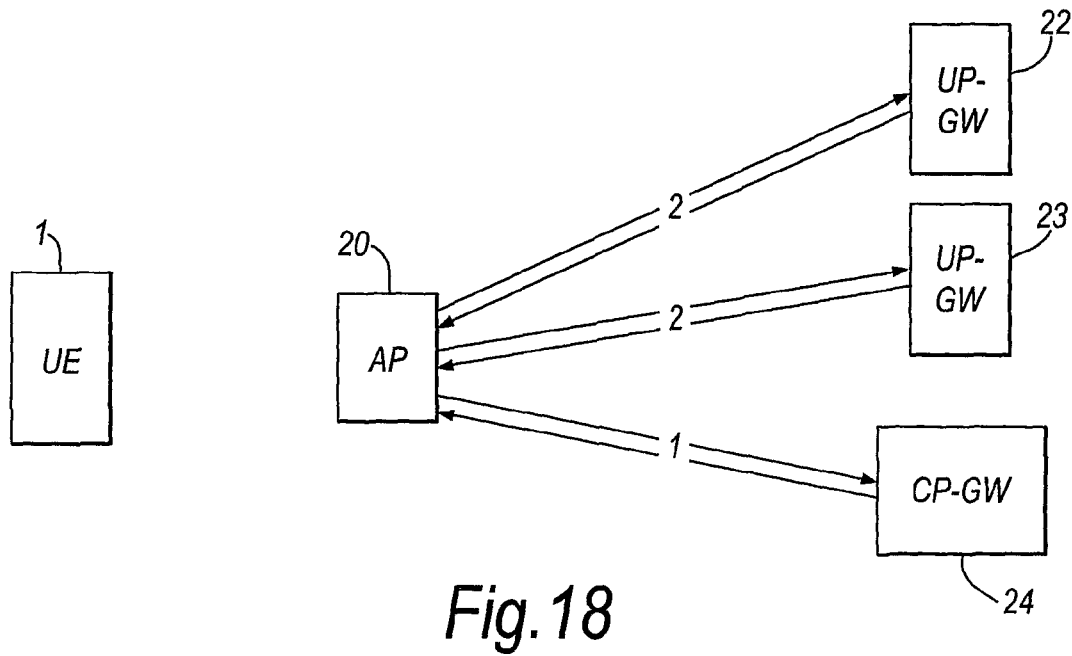
FIG. 18 shows the expiry of a connected state timer in an access point.

FIG. 18 shows Expiry of Connected State Timer at AP/Leaving Active state. The following actions are performed:

1. When the Active expires in the AP 20, the AP 20 signals to the CP-GW 24 that the UE 1 is no longer in Active state and therefore the CP-GW 24 will be required to co-ordinate paging over all the Equivalent RAs allocated to the UE 1.

2. The AP 20 passes a dummy packet on each of the IP connections to the TEID associated with the PDP context for the UE 1 on the UP-GWs 22,23. (If Soft Handover Combining is in use, the AP 20 would signal to the 'drift' AP instructing them to release their associations to the UP-GW functions.)

It is believed that, the description given above shows that there are mechanisms available for limiting "inactive mode signaling" while maintaining the E-UTRA core network separate from the 2G/UTRA core network.

Upgrades to existing equipment are necessary, but these upgrades may be limited to software.

The functionality described above can be considered as part of a "plus" that needs to be added to "Gn/Gp" in FIG. B.1a and as part of the "plus" in either "Gi+" and/or "Rh" in FIG. B.2 in TR 23.882, which is hereby fully incorporated by reference.

Note: the use of some "GPRS terminology" in the description does NOT imply that these interfaces/functions are reused by LTE/SAE, rather, the terms are just used to aid comprehension of the concept.

The invention claimed is:

1. A telecommunications system comprising:
a first radio access technology having a first radio access network divided into a plurality of first areas, the first radio access network having a network core;
a second radio access technology comprising a second radio access network divided into a plurality of second areas;
a mobile terminal concurrently positioned in one of the first areas and one of the second areas, the first and second areas in which the mobile terminal is positioned being deemed to be equivalent routing areas allocated to the mobile terminal, the mobile terminal being registerable with each of the radio access technologies corresponding to the equivalent routing areas, the mobile terminal having an active state in which a communication session with the registered radio access technology is established and an inactive state when no such communication with the registered radio access technology is established, the mobile terminal being registerable with only one of the radio access technologies at a time;
a home subscriber server entity common to both the first and second radio access technologies and which monitors/stores in which of the first and second areas the mobile terminal is registered; and
a common control plane gateway entity positioned within the network core of the first radio access network, the common control plane gateway entity being configured such that communications from the first and second radio access networks, which relate to the first and second areas in which the mobile terminal is positioned, are routed through the common control plane gateway entity, wherein with no signaling to the home subscriber server entity, the mobile terminal is moveable from an inactive state corresponding to registration of the mobile terminal with the first radio access technology to an inactive state corresponding to registration of the mobile terminal with the second radio access technology.

2. The system of claim 1, wherein the control plane gateway entity comprises part of a Gr interface to the home subscriber server entity.

3. The system of claim 1, wherein the control plane gateway entity receives communications relating to the first areas from an SGSN of the first radio access technology.

4. The system of claim 1, wherein the first areas are different from the second areas.

5. The system of claim 1, wherein a timer runs between the control plane gateway entity and the mobile terminal when the mobile terminal is registered with both the first and second radio access technologies, which timer causes the first and second areas to be updated periodically.

6. The system of claim 1, wherein the mobile terminal is allocated a temporary identifier when registered in each of the radio access technologies corresponding to the equivalent routing areas, the temporary identifier being different when registered in each radio access technology.

7. The system of claim 1, wherein, when the mobile terminal is registered with the first radio access technology, and is in the inactive state, the mobile terminal operates a timer to cause the mobile terminal to attempt to contact the home subscriber service entity at predetermined time intervals, and wherein the timer is also operated when the mobile terminal is registered with the second radio access technology.

8. The system of claim 1, wherein, when the mobile terminal is registered with the second radio access technology, and the mobile terminal modifies a state by notifying the control plane gateway entity, a reference value stored by the first radio access technology is updated, and wherein, when the mobile terminal is subsequently registered with the first radio access technology the change in reference value is detected, which prompts the first radio access technology to obtain information regarding the state change from the control plane gateway entity.

9. The system of claim 1, wherein mobile terminal terminating activities based on identifiers used only within the first or second radio access technologies are routed to the control plane gateway entity.

10. The system of claim 1, wherein the home subscriber server entity is positioned within the network core of the first radio access network.

11. The system of claim 1, wherein the first radio access network comprises an SGSN that communicates with the common control plane gateway entity, and the second radio access network comprises an access point that communicates directly with the common control plane gateway entity.

12. The system of claim 11, wherein the common control plane gateway entity is communicatively positioned between the SGSN and the home subscriber server entity.

13. The system of claim 11, wherein communications between the SGSN and the home subscriber server entity pass through the common control plane gateway entity.

14. The system of claim 11, wherein the access point hosts BTS and control plane RNC functions.

15. A telecommunications system comprising:
a first radio access technology having a first radio access network divided into a plurality of first areas;
a second radio access technology having a second radio access network divided into a plurality of second areas;
a mobile terminal concurrently positioned in one of the first areas and one of the second areas, the first and second areas in which the mobile terminal is positioned being deemed to be equivalent routing areas allocated to the mobile terminal, the mobile terminal being registerable with each of the radio access technologies corresponding to the equivalent routing areas, the mobile terminal having an active state in which a communication session with the registered radio access technology is established and an inactive state when no such communication with the registered radio access technology is established, the mobile terminal being registerable with only one of the radio access technologies at a time;
a home subscriber server entity common to both the first and second radio access technologies and which monitors/stores in which of the first and second areas a mobile terminal is registered; and
a user plane gateway through which communications from the first and second radio access networks are routed, the user plane gateway being positioned within a network core of the first radio access network, the user plane gateway maintaining an indication of whether the mobile terminal last transmitted data using the second radio access technology, wherein with no signaling to the home subscriber server entity, the mobile terminal is moveable from an inactive state corresponding to registration of the mobile terminal with the first radio access technology to an inactive state corresponding to registration of the mobile terminal with the second radio access technology.

16. The system of claim 15, wherein the user plane gateway maintains a second indication, indicating whether the mobile terminal is registered with the second radio access technology.

17. The system of claim 16, wherein, if the second indication indicates that the mobile terminal is not registered with the second access technology and the first indication indicates that the mobile terminal last transmitted data using the second radio access technology, the user plane gateway passes a copy of a downlink data packet to the first radio access technology.

18. The system of claim 17, wherein the first radio access technology determines whether the mobile terminal is able to receive the copy of the downlink data packet.

19. The system of claim 18, wherein the determination is based on whether the mobile terminal is in a standby state of the first radio access technology.

20. The system of claim 18, wherein the determination is based on whether a connection to the mobile terminal exists on the first radio access technology.

21. The system of claim 18, wherein, if the mobile terminal is unable to receive the copy of the downlink data packet, the data packet is returned to the user plane gateway by the first radio access technology.

22. The system of claim 21, wherein the data packet is returned to the user plane gateway together with an indication that paging in a wider area should be performed.

23. A telecommunications system comprising:
a first radio access technology having a first radio access network divided into a plurality of first areas;
a second radio access technology having a second radio access network divided into a plurality of second areas;
a mobile terminal concurrently positioned in one of the first areas and one of the second areas, the first and second areas in which the mobile terminal is positioned being deemed to be equivalent routing areas allocated to the mobile terminal, the mobile terminal being registerable with each of the radio access technologies corresponding to the equivalent routing areas;
a home subscriber server entity common to both the first and second radio access technologies and which monitors/stores in which of the first and second areas a mobile terminal is registered; and
a user plane gateway entity through which communications from the first and second radio access networks are routed, the user plane gateway entity being positioned within a network core of the first radio access network,
wherein upon receipt by the user plane gateway entity of a downlink packet addressed to the mobile terminal, the mobile terminal is paged in all of the equivalent routing areas allocated to the mobile terminal, and
wherein with no signaling to the home subscriber server entity, the mobile terminal is moveable from an inactive state corresponding to registration of the mobile terminal with the first radio access technology to an inactive state corresponding to registration of the mobile terminal with the second radio access technology.

24. The system of claim 23, wherein the paging of the mobile terminal is performed simultaneously or concurrently in all of the equivalent routing areas.

25. The system of claim 23, wherein the user plane gateway maintains a first indication of whether the mobile terminal last transmitted data using the second radio access technology, and a second indication indicating whether the mobile terminal is registered with the second radio access technology, and the mobile terminal is paged in all of the equivalent routing areas only when the second indication indicates that the mobile terminal is not registered with the second access technology and the first indication indicates that the mobile terminal last transmitted data using the second radio access technology.

26. The system of claim 23, further comprising a third radio access technology having a third radio access network divided into a plurality of third areas, the third areas being different than the second areas and the first areas, wherein the mobile terminal is also positioned in one of the third areas concurrent with being positioned in the one of the first areas and the one of the second areas such that the third area in which the mobile terminal is positioned is also deemed to be an equivalent routing area allocated to the mobile terminal.

27. A telecommunications system comprising:
a first radio access technology having a first radio access network divided into a plurality of first areas, the first radio access network having a network core;
a second radio access technology comprising a second radio access network divided into a plurality of second areas;
a mobile terminal positioned in one of the first areas and one of the second areas, the first and second areas in which the mobile terminal is positioned being deemed to be equivalent routing areas, the mobile terminal being registerable with each of the radio access technologies corresponding to the equivalent routing areas, the mobile terminal being registerable with only one of the radio access technologies at a time;
a home subscriber server entity common to both the first and second radio access technologies and which monitors/stores in which of the first and second areas the mobile terminal is registered; and
a common control plane gateway entity positioned within the network core of the first radio access network, the common control plane gateway entity being configured such that communications from the first and second radio access networks, which relate to the first and second areas in which the mobile terminal is positioned, are routed through the common control plane gateway entity; and
a common update timer run between the control plane gateway entity and the mobile terminal, the common update timer being run when the mobile terminal is registered with the first radio access technology and when the mobile terminal is registered with the second radio access technology, which timer causes the first and second areas to be updated periodically,
wherein with no signaling to the home subscriber server entity, the mobile terminal is moveable from an inactive state corresponding to registration of the mobile terminal with the first radio access technology to an inactive state corresponding to registration of the mobile terminal with the second radio access technology.

28. The system of claim 27, wherein if the timer expires while the mobile terminals is not in first radio access technology coverage, the mobile terminal contacts the first radio access technology when it next returns to first radio access technology coverage.

29. The system of claim 27, wherein, when the mobile terminal is registered with the first radio access technology and is in an inactive state, the mobile terminal attempts to contact the home subscriber server entity at predetermined time intervals based on the value of the timer.

30. The system of claim 29, wherein if the timer expires while the mobile terminals is not in first radio access technology coverage, the mobile terminal contacts the first radio access technology when the mobile terminal next returns to first radio access technology coverage.

31. The system of claim 27,
wherein, when the mobile terminal is registered with the second radio access technology and the mobile terminal modifies a state by notifying the control plane gateway entity, a reference value stored by the first radio access technology is updated, and
wherein, when the mobile terminal is subsequently registered with the first radio access technology, the change in the reference value is detected, which prompts the first radio access technology to obtain information from the control plane gateway entity regarding the state change.

32. The system of claim 31, wherein if the timer expires while the mobile terminals is not in first radio access technology coverage, the mobile terminal contacts the first radio access technology when the mobile terminal next returns to first radio access technology coverage.

33. A telecommunications system comprising:
a first radio access technology having a first radio access network divided into a plurality of first areas, the first radio access network having a network core;
a second radio access technology comprising a second radio access network divided into a plurality of second areas;
a mobile terminal positioned in one of the first areas and one of the second areas, the first and second areas in which the mobile terminal is positioned being deemed to be equivalent routing areas, the mobile terminal being registerable with each of the radio access technologies corresponding to the equivalent routing areas, the mobile terminal being registerable with only one of the radio access technologies at a time;
a home subscriber server entity common to both the first and second radio access technologies and which monitors/stores in which of the first and second areas the mobile terminal is registered; and
a common control plane gateway entity positioned within the network core of the first radio access network, the common control plane gateway entity being configured such that communications from the first and second radio access networks, which relate to the first and second areas in which the mobile terminal is positioned, are routed through the common control plane gateway entity, wherein mobile terminating activities based on identifiers are routed to the common control plane gateway entity,
wherein with no signaling to the home subscriber server entity, the mobile terminal is moveable from an inactive state corresponding to registration of the mobile terminal with the first radio access technology to an inactive state corresponding to registration of the mobile terminal with the second radio access technology.

34. The system of claim 33, wherein the identifiers are MSISDN or IMSI.

35. The system of claim 34, wherein the mobile terminating activities based on MSISDN or IMSI comprise a location service and an SMS.

36. A telecommunications system comprising:
a first radio access technology having a first radio access network divided into a plurality of first areas, the first radio access network comprising a UTRA SGSN;
a second radio access technology having a second radio access network divided into a plurality of second areas;
a mobile terminal concurrently positioned in one of the first areas and one of the second areas, the first and second areas in which the mobile terminal is positioned being deemed to be equivalent routing areas, the mobile terminal being registerable with each of the radio access technologies corresponding to the equivalent routing areas;
a home subscriber server entity common to both the first and second radio access technologies and which monitors/stores in which of the first and second areas the mobile terminal is registered; and
a user plane gateway entity through which communications from the first and second radio access networks are routed, the user plane gateway entity being positioned within a network core of the first radio access network, the user plane gateway entity maintaining an indication of whether the mobile terminal was last in the second radio access technology,
wherein with no signaling to the home subscriber server entity, the mobile terminal is moveable from an inactive state corresponding to registration of the mobile terminal with the first radio access technology to an inactive state corresponding to registration of the mobile terminal with the second radio access technology, and
wherein upon receipt by the user plane gateway entity of a downlink packet addressed to the mobile terminal when the indication indicates that the mobile terminal was last in the second radio access technology:
the downlink packet is sent to the SGSN; and
if an Iu connection for the mobile terminal does not exist:
the SGSN returns a copy of the packet to the user plane gateway entity with an indication that parallel paging in a wider area should be performed; and
the SGSN initiates paging for the mobile terminal in UTRA.

37. The system of claim 36, wherein if an Iu connection for the mobile terminal exists, the SGSN forwards the packet to the RNC on the Iu connection.

38. The system of claim 37, wherein upon completion of the paging for the mobile terminal in UTRA, the SGSN indicates to the user plane gateway entity whether the mobile terminal was reachable.

39. The system of claim 36, wherein the second radio access network comprises an access point.

40. The system of claim 36, wherein the mobile terminal is paged in all of the equivalent routing areas when the user plane gateway receives an indication from the SGSN that parallel paging in a wider area should be performed.

* * * * *